US010936192B2

(12) United States Patent
Krasner et al.

(10) Patent No.: US 10,936,192 B2
(45) Date of Patent: Mar. 2, 2021

(54) SYSTEM AND METHOD FOR EVENT DRIVEN STORAGE MANAGEMENT

(71) Applicant: EMC IP Holding Company LLC, Hopkinton, MA (US)

(72) Inventors: Jonathan I. Krasner, Coventry, RI (US); Daryl Francis Kinney, Hopkinton, MA (US); William Alan Hatstat, Spencer, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 146 days.

(21) Appl. No.: 16/402,205

(22) Filed: May 2, 2019

(65) Prior Publication Data

US 2020/0348840 A1 Nov. 5, 2020

(51) Int. Cl.
G06F 3/06 (2006.01)
G06N 20/00 (2019.01)

(52) U.S. Cl.
CPC .......... *G06F 3/0604* (2013.01); *G06F 3/0655* (2013.01); *G06F 3/0674* (2013.01); *G06N 20/00* (2019.01)

(58) Field of Classification Search
None
See application file for complete search history.

(56) References Cited

U.S. PATENT DOCUMENTS

| 7,818,475 | B2 | 10/2010 | Frey et al. |
| 8,135,918 | B1 | 3/2012 | Yueh |
| 9,026,694 | B1 | 5/2015 | Davidson et al. |
| 9,430,125 | B1 | 8/2016 | Blitzer et al. |
| 2003/0084209 | A1 | 5/2003 | Chadalapaka |
| 2006/0161733 | A1 | 7/2006 | Beckett et al. |
| 2009/0006716 | A1 | 1/2009 | Lubbers et al. |
| 2017/0093760 | A1 | 3/2017 | Hathorn et al. |
| 2017/0315726 | A1 | 11/2017 | White et al. |

*Primary Examiner* — William E. Baughman
(74) *Attorney, Agent, or Firm* — Chamberlain, Hrdlicka, White, Williams & Aughtry

(57) ABSTRACT

A storage array for providing data storage services includes persistent storage that stores approved preferences and a storage array manager that obtains event-response preferences for hosts receiving the data storage services; predicts, based on the event-response preferences, a set of additional event-response preferences for a host of the hosts; predicts an additional event-response preference for a host of the hosts based on a request associated with a second host of the hosts; generates a heat map for the host based on: the event-response preferences, the set of additional event-response preferences, the additional event-response preference, and global event-response preferences that associate events with responses for all of the hosts; identifies a final set of event-response preferences for the host using the heat map; updates the approved preferences based on the final set of event-response preferences; and provides unsolicited data to the host based on the updated approved preferences.

20 Claims, 18 Drawing Sheets

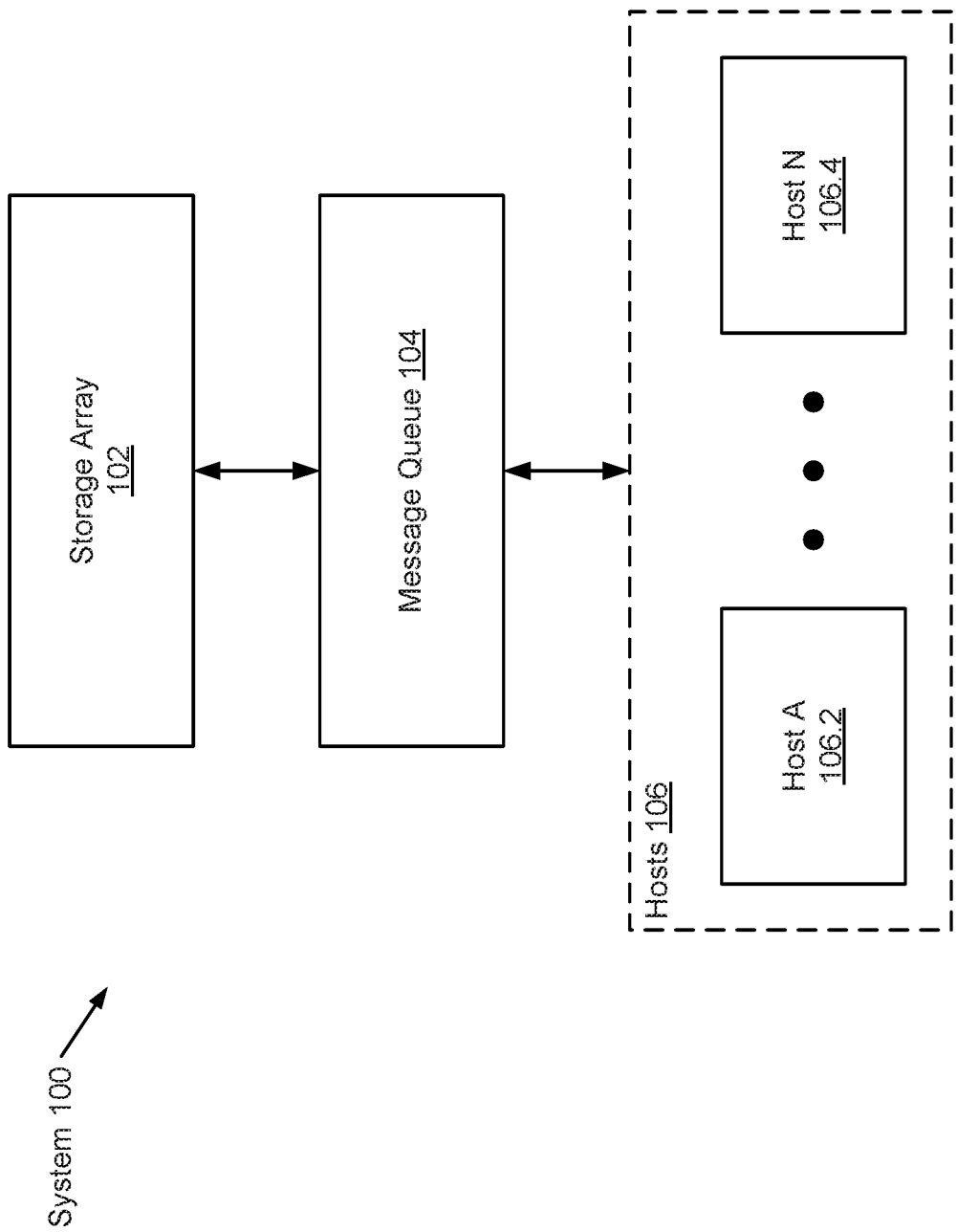
FIG. 1.1

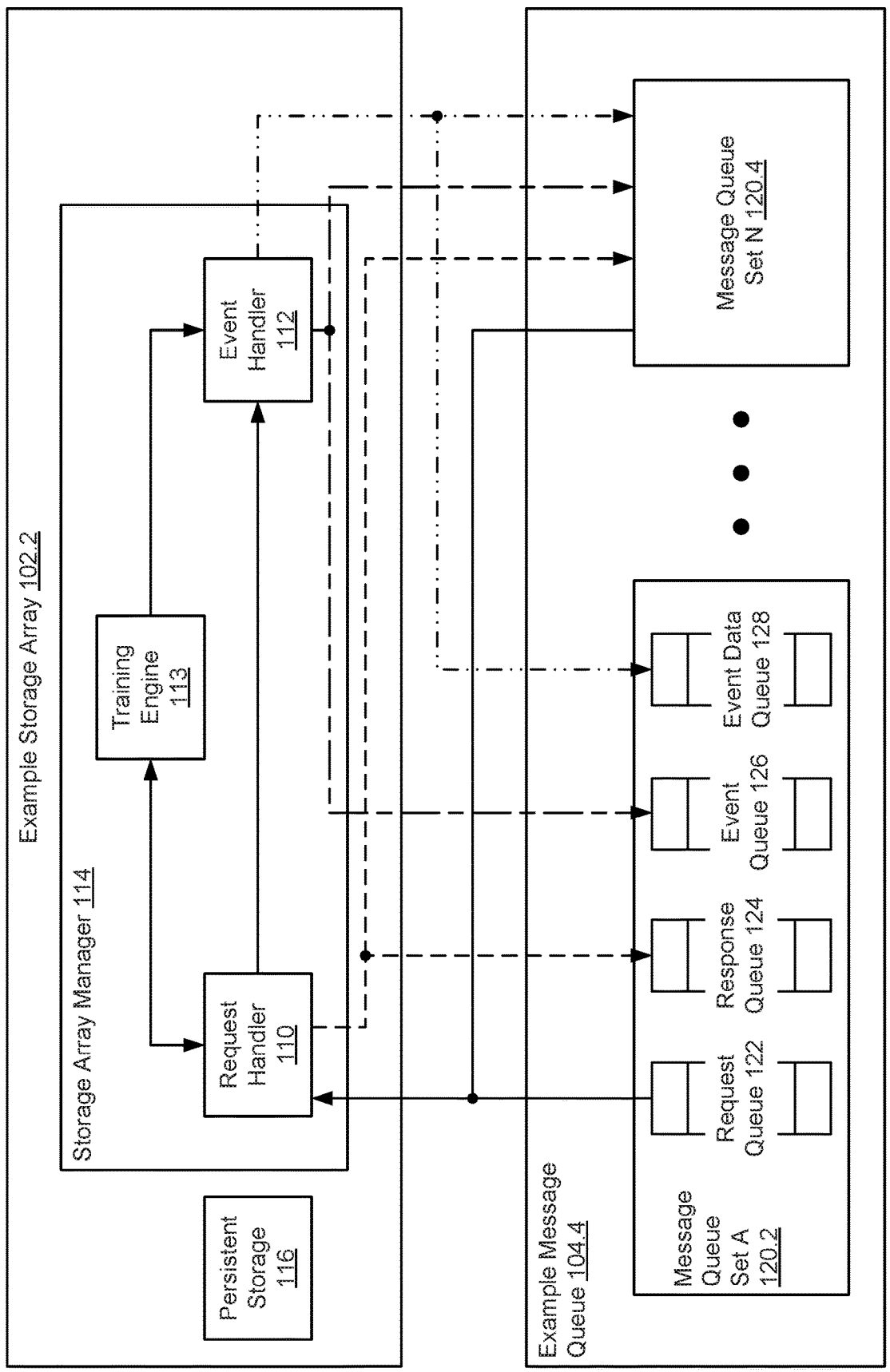
FIG. 1.2

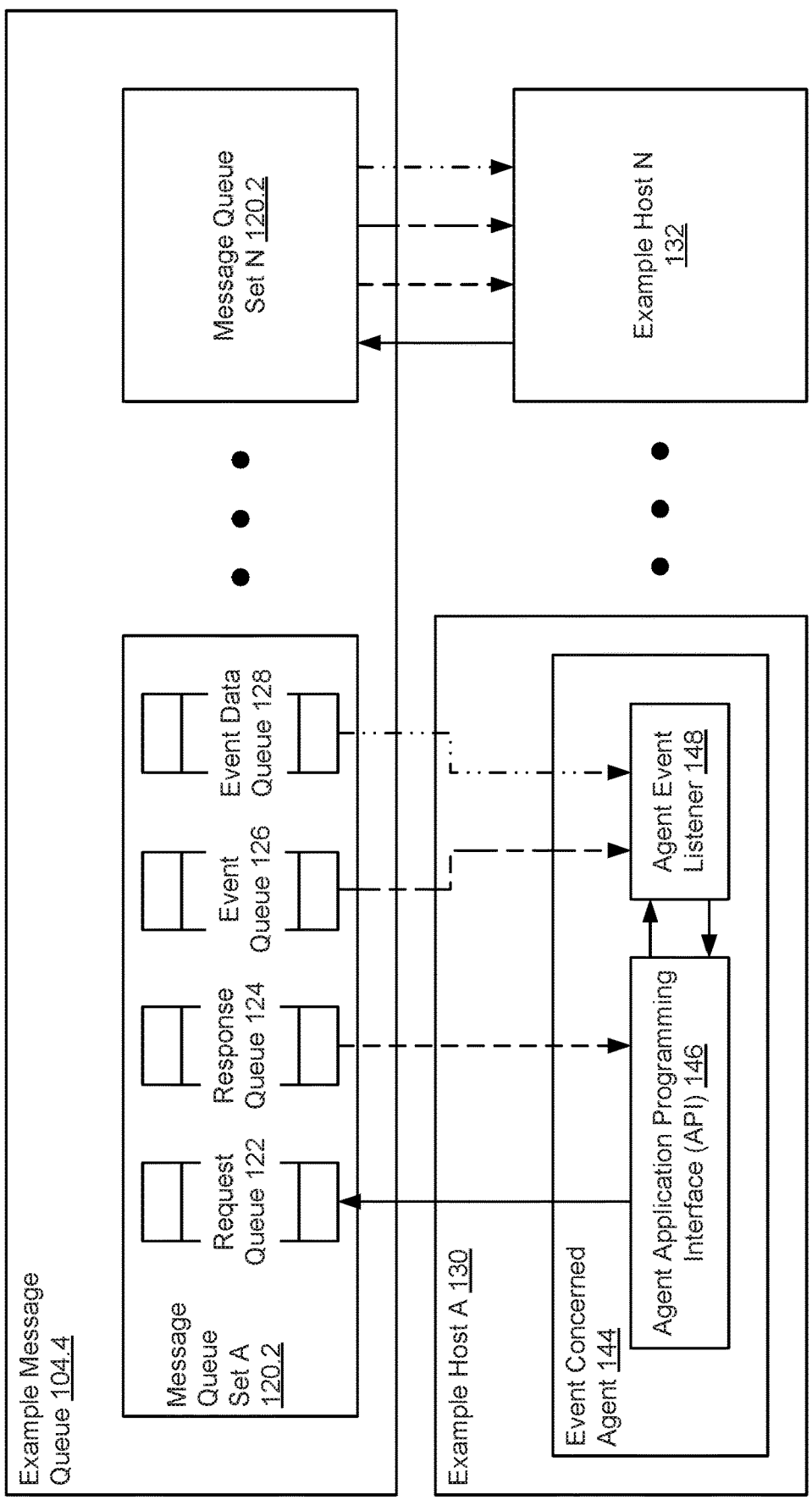
FIG. 1.3

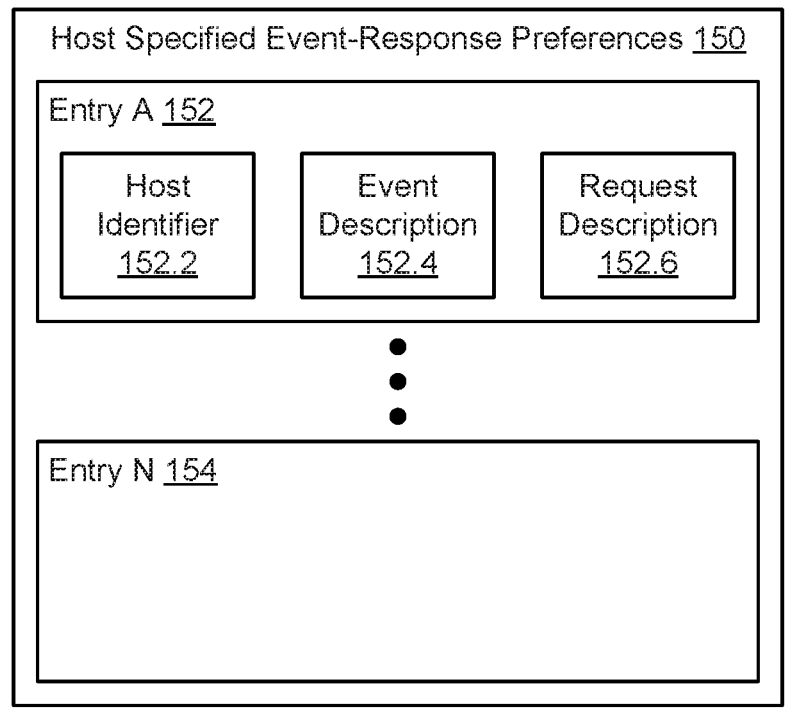
FIG. 1.4
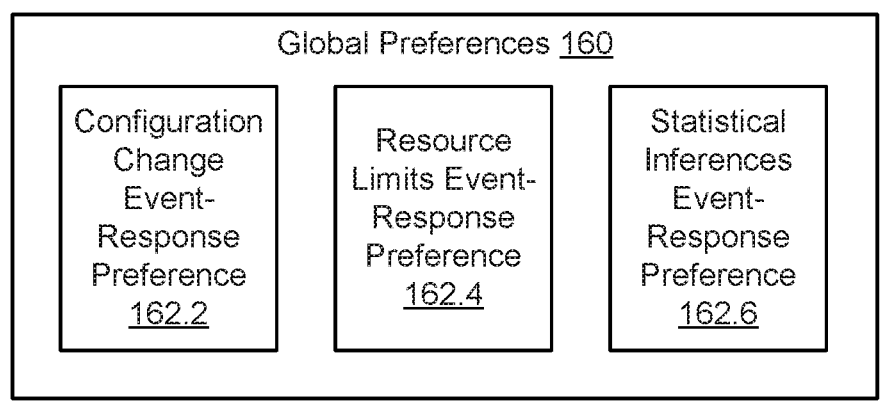
FIG. 1.5

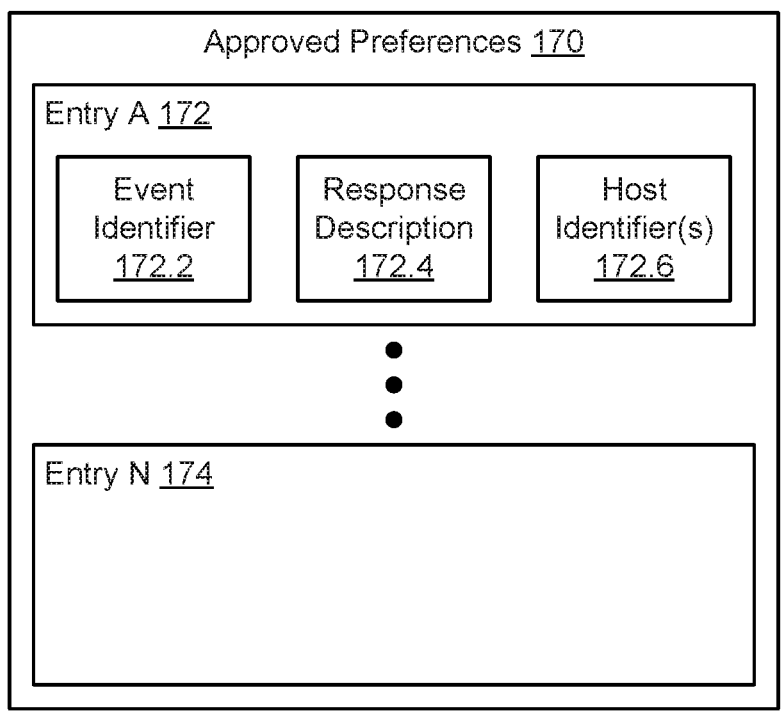
FIG. 1.6
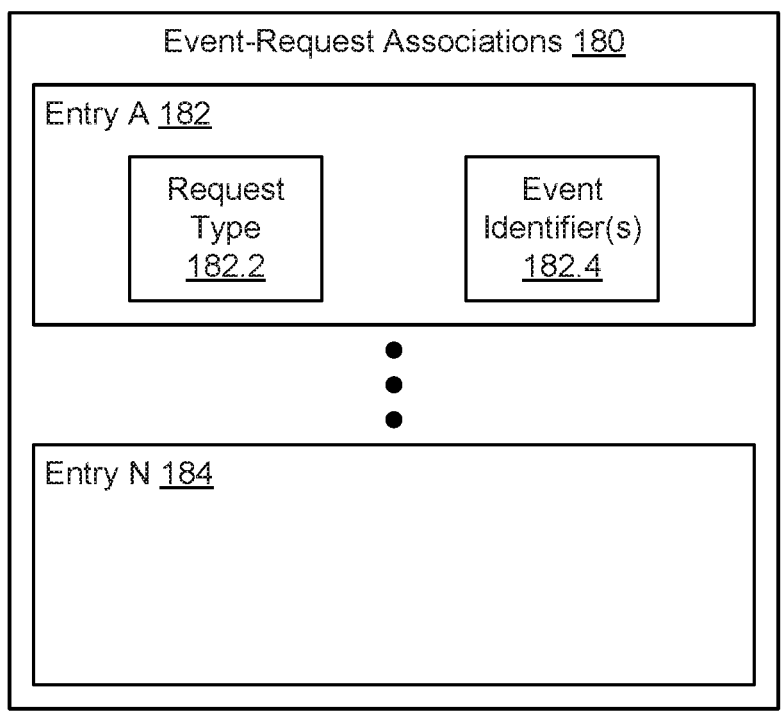
FIG. 1.7

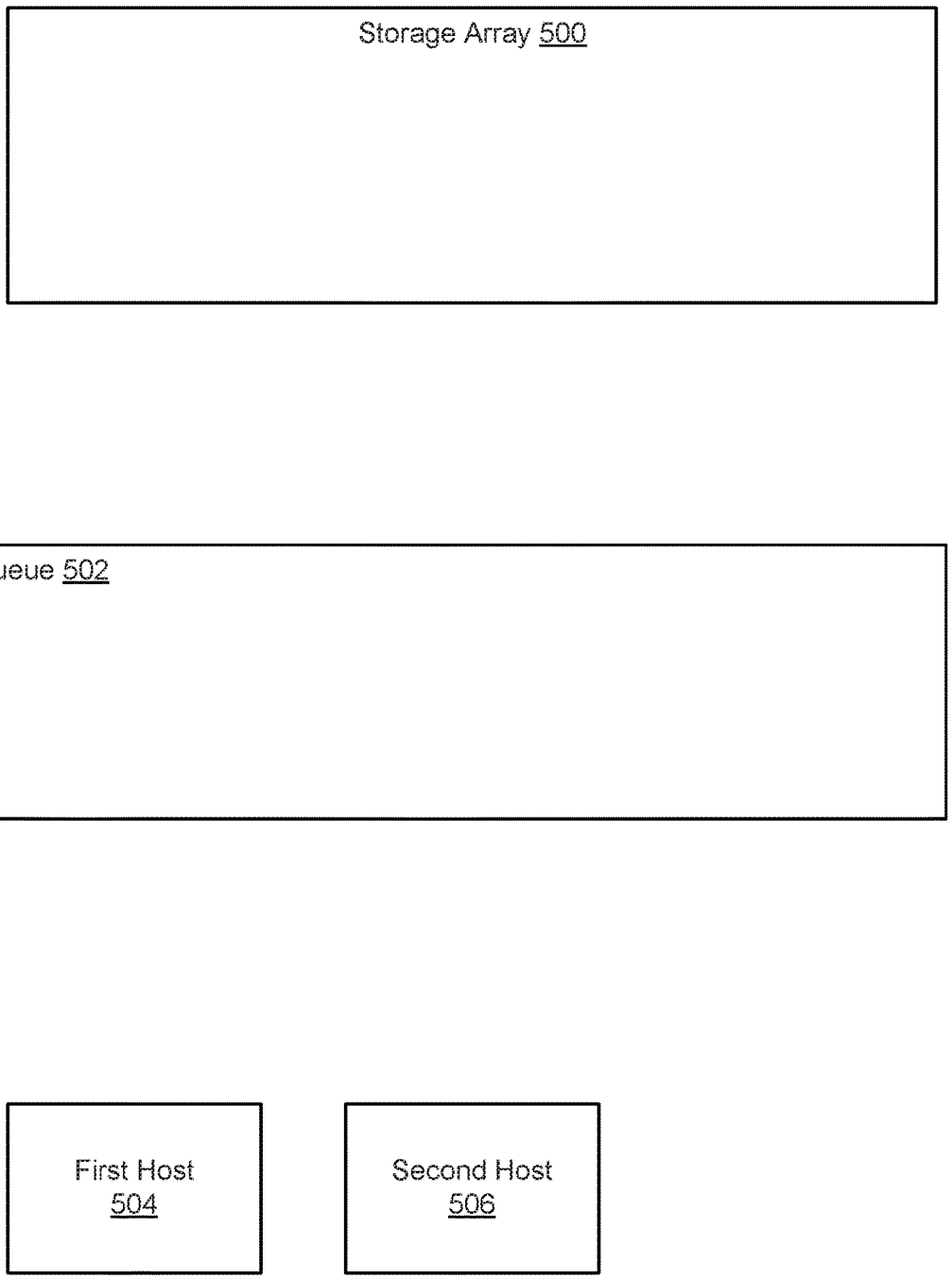
FIG. 5.1

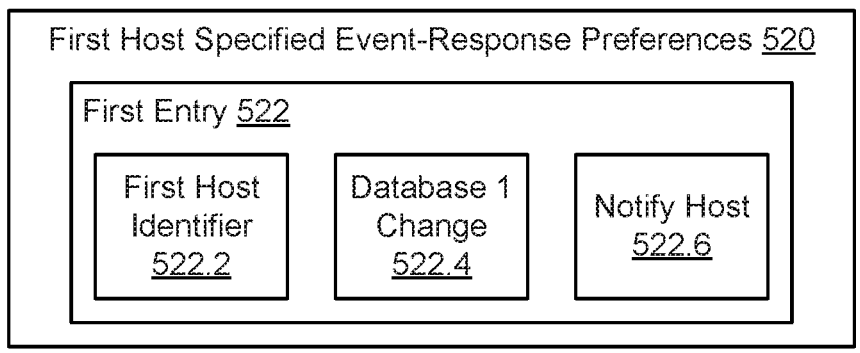
FIG. 5.2
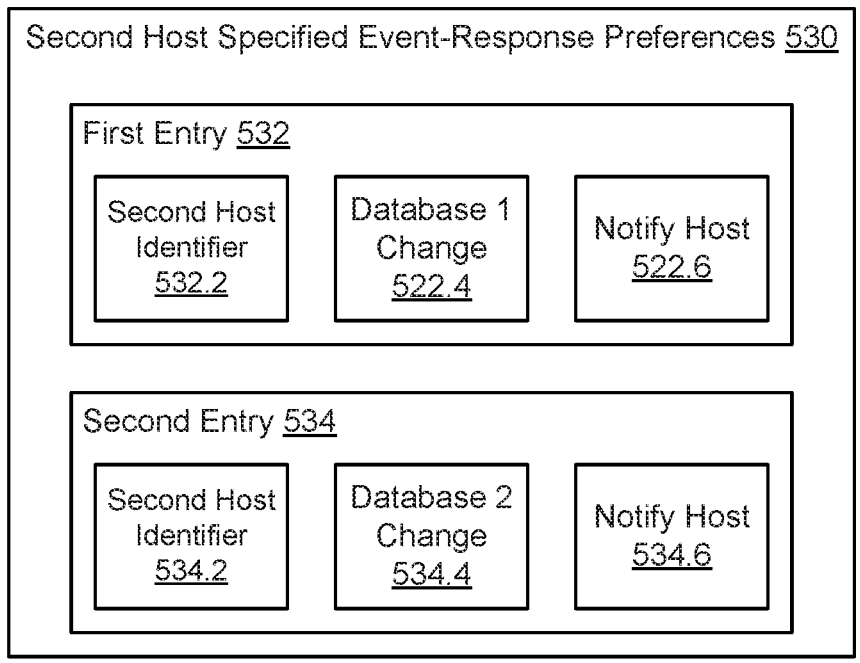
FIG. 5.3

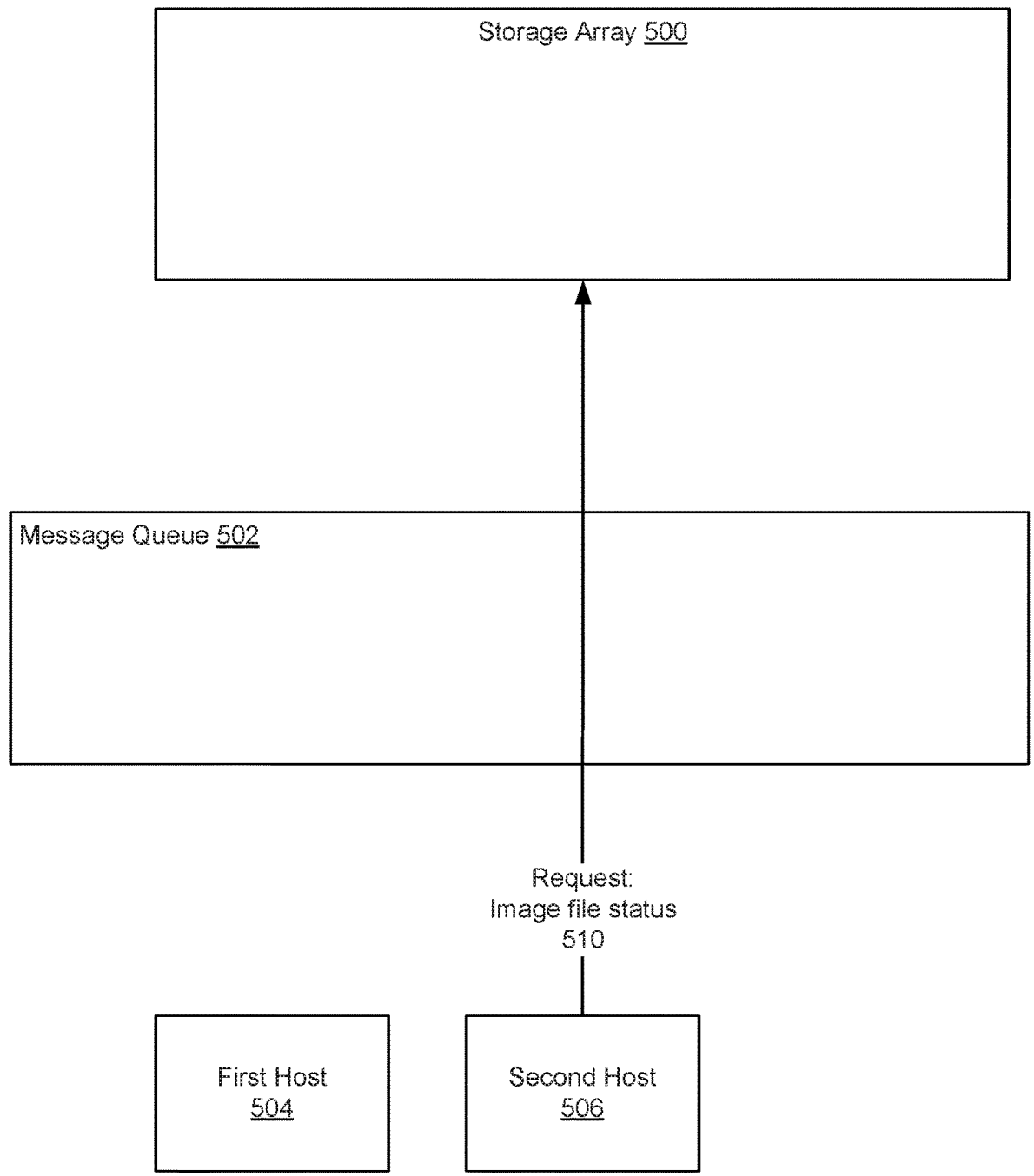
FIG. 5.4

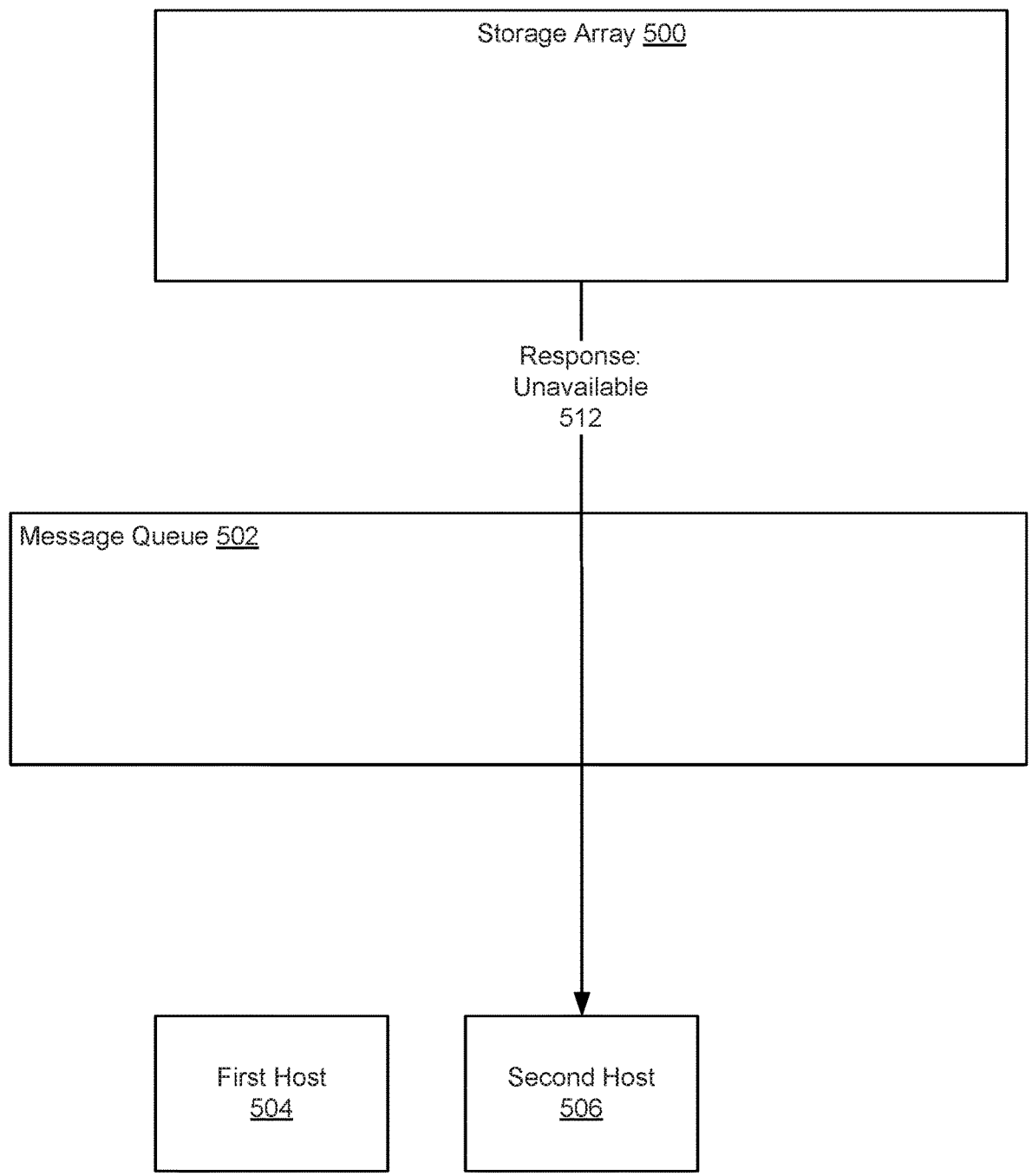
FIG. 5.5

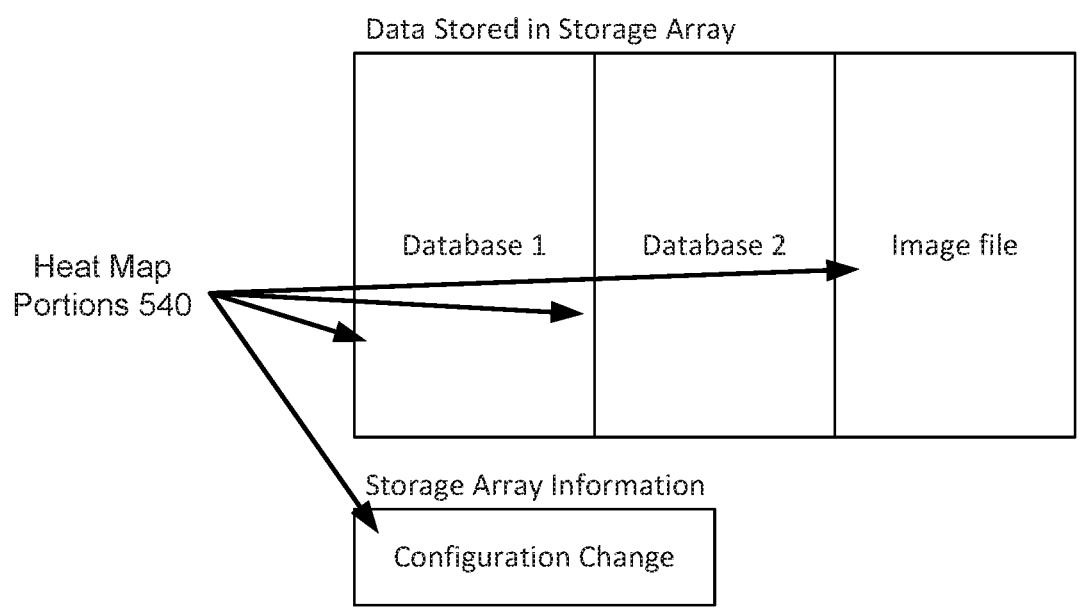
FIG. 5.6

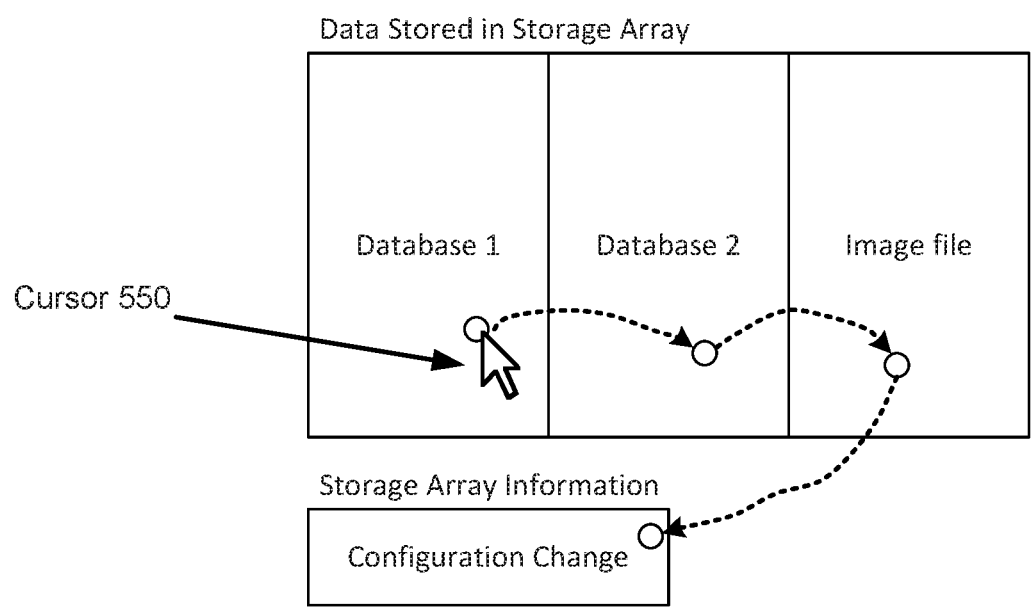
FIG. 5.7

Approved Preferences:
configuration change -- notify first host
database 1 change -- notify first host, notify second host
database 2 change -- notify first host, notify second host
image file change -- notify first host
568

FIG. 5.8

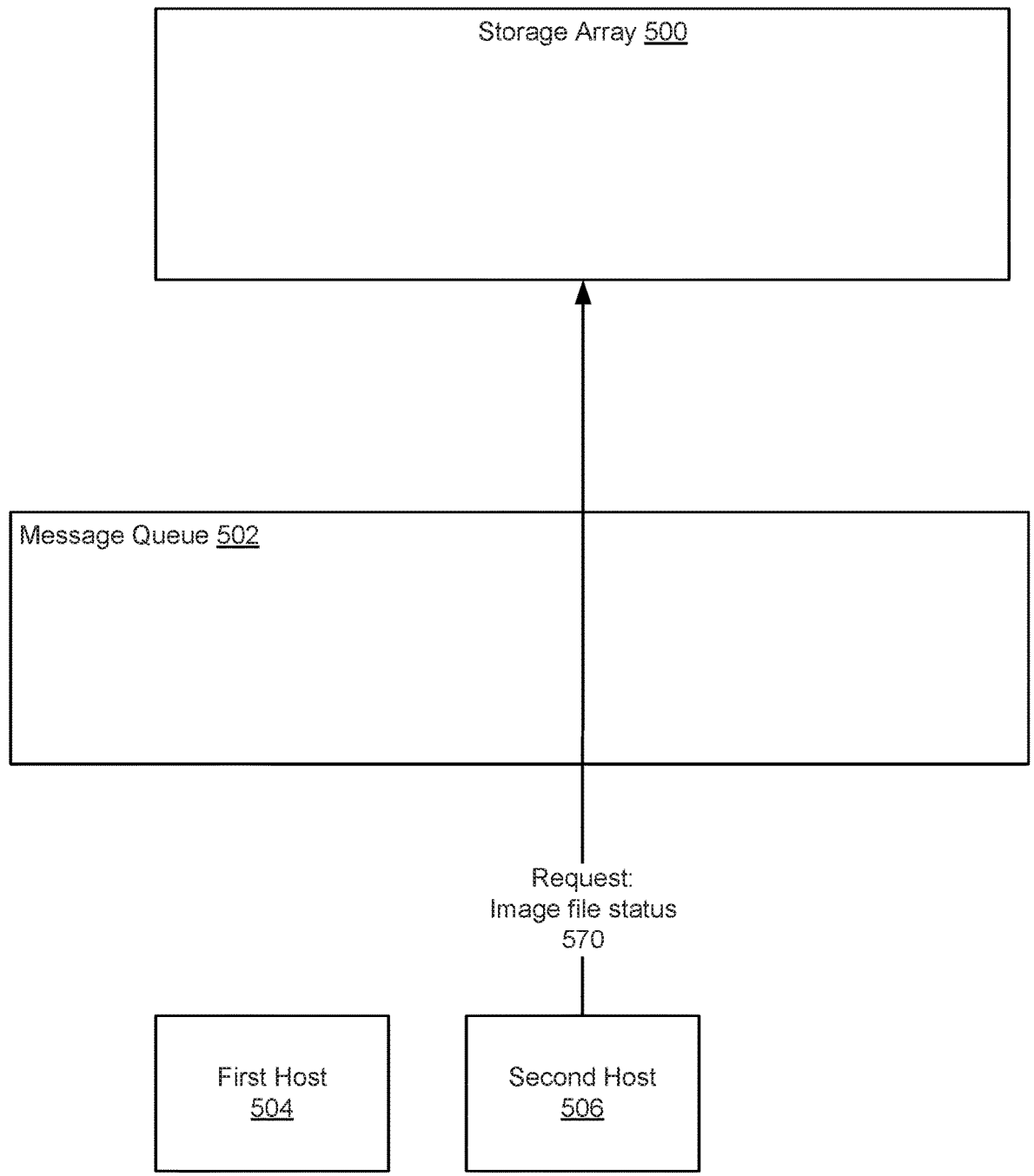
FIG. 5.9

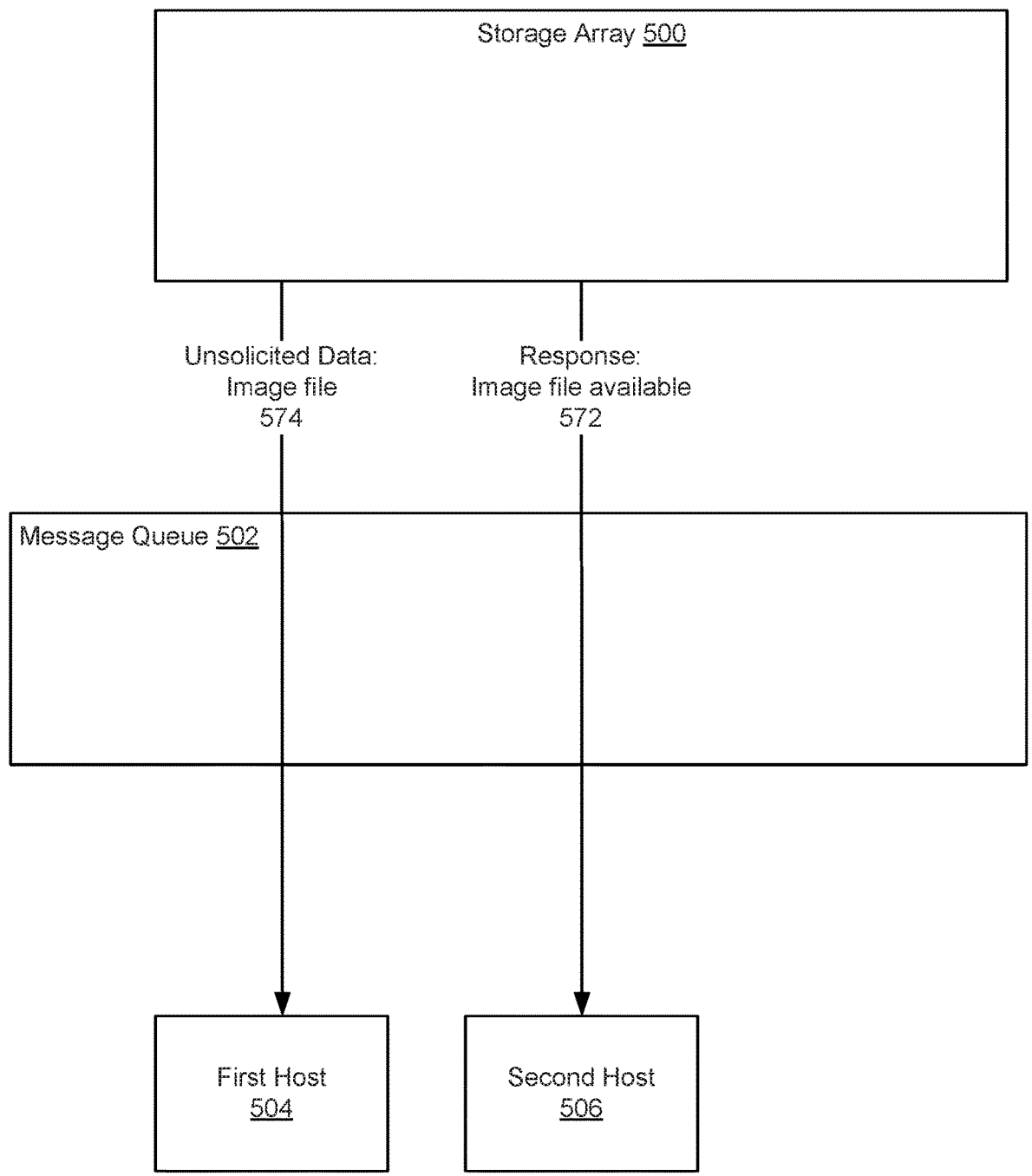
FIG. 5.10

SYSTEM AND METHOD FOR EVENT DRIVEN STORAGE MANAGEMENT

BACKGROUND

Computing devices may generate data during their operation. For example, applications hosted by the computing devices may generate data used by the applications to perform their functions. Such data may be stored in persistent storage of the computing devices.

Data generated by computing devices may also be stored remotely from the computing devices. Such remote storage may be utilized to, for example, redundantly store multiple copies of data for data protection purposes, free storage space by storing the data without utilizing persistent storage of the computing devices, or for other reasons.

SUMMARY

In one aspect, a storage array for providing data storage services in accordance with one or more embodiments of the invention includes persistent storage and a storage array manager. The persistent storage stores approved preferences. The storage array manager obtains event-response preferences for hosts receiving the data storage services; predicts, based on the event-response preferences, a set of additional event-response preferences for a host of the hosts; predicts an additional event-response preference for a host of the hosts based on a request associated with a second host of the hosts; generates a heat map for the host based on: the event-response preferences, the set of additional event-response preferences, the additional event-response preference, and global event-response preferences that associate events with responses for all of the hosts; obtains host input, using the heat map, to identify a final set of event-response preferences for the host; updates the approved preferences based on the final set of event-response preferences for the host to obtain updated approved preferences; and provides unsolicited data to the host based on the updated approved preferences.

In one aspect, a method for providing data storage services in accordance with one or more embodiments of the invention includes obtaining event-response preferences for hosts receiving the data storage services; predicting, based on the event-response preferences, a set of additional event-response preferences for a host of the hosts; predicting an additional event-response preference for a host of the hosts based on a request associated with a second host of the hosts; generating a heat map for the host based on: the event-response preferences, the set of additional event-response preferences, the additional event-response preference, and global event-response preferences that associate events with responses for all of the hosts; obtaining host input, using the heat map, to identify a final set of event-response preferences for the host; updating approved preferences based on the final set of event-response preferences for the host to obtain updated approved preferences; and providing unsolicited data to the host based on the updated approved preferences.

In one aspect, a non-transitory computer readable medium in accordance with one or more embodiments of the invention includes computer readable program code, which when executed by a computer processor enables the computer processor to perform a method for providing data storage services. The method includes obtaining event-response preferences for hosts receiving the data storage services; predicting, based on the event-response preferences, a set of additional event-response preferences for a host of the hosts; predicting an additional event-response preference for a host of the hosts based on a request associated with a second host of the hosts; generating a heat map for the host based on: the event-response preferences, the set of additional event-response preferences, the additional event-response preference, and global event-response preferences that associate events with responses for all of the hosts; obtaining host input, using the heat map, to identify a final set of event-response preferences for the host; updating approved preferences based on the final set of event-response preferences for the host to obtain updated approved preferences; and providing unsolicited data to the host based on the updated approved preferences.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example storage array and example message queue in accordance with one or more embodiments of the invention.

FIG. 1.3 shows a diagram of an example message queue and an example hosts in accordance with one or more embodiments of the invention.

FIG. 1.4 shows a diagram of host specified event-response preferences in accordance with one or more embodiments of the invention.

FIG. 1.5 shows a diagram of global preferences in accordance with one or more embodiments of the invention.

FIG. 1.6 shows a diagram of approved preferences in accordance with one or more embodiments of the invention.

FIG. 1.7 shows a diagram of event-response preferences in accordance with one or more embodiments of the invention.

FIGS. 5.1-5.10 show a non-limiting example of a system in accordance with embodiments of the invention.

DETAILED DESCRIPTION

Figure 2:
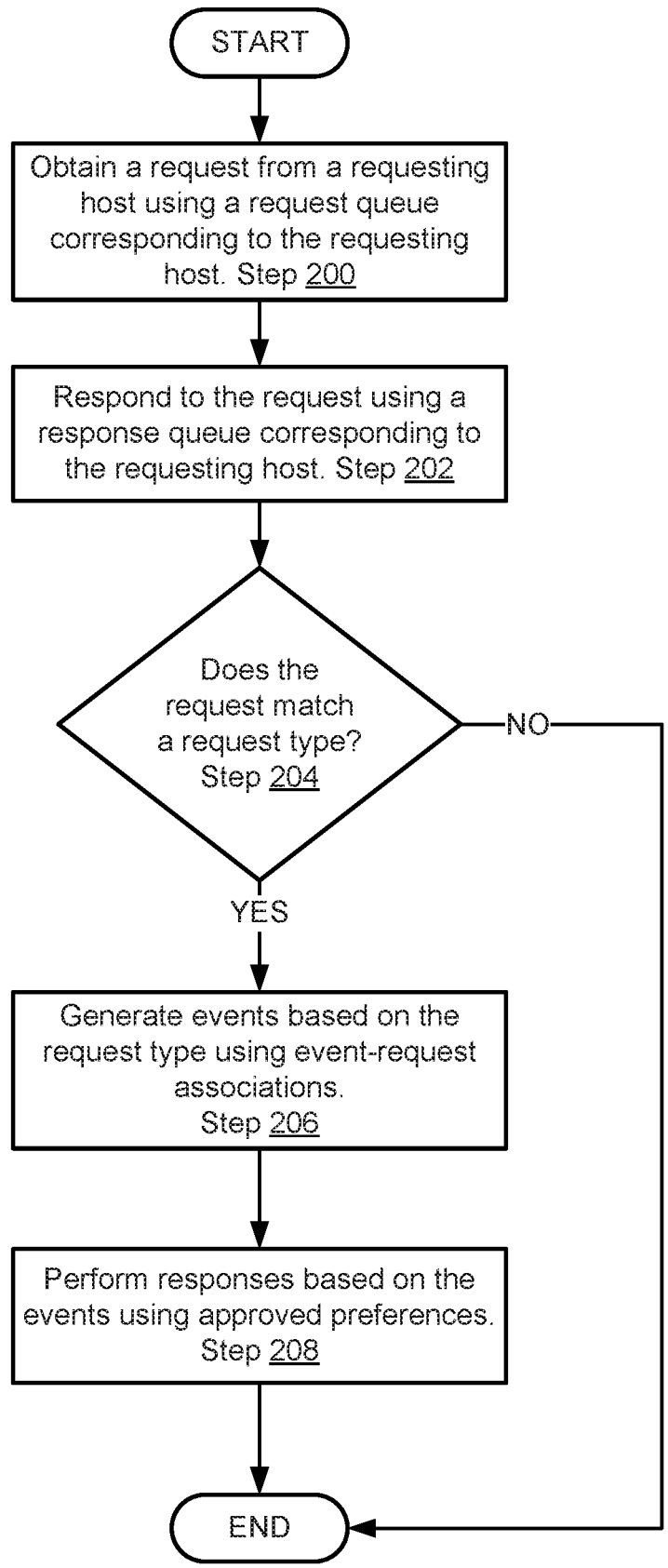
FIG. 2 shows a flowchart of a method of responding to a request in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for responding to requests from hosts. Embodiments of the invention may provide a method for responding to the requests that makes it less likely that similar requests will be issued by the hosts in the future. By doing so, the computational resources utilized for responding to such requests may be reduced when compared to systems that respond to such requests in a different manner.

In one or more embodiments of the invention, the system proactively puts in place courses of actions to be performed in response to the occurrence of events. The events may be, for example, particular requests from hosts. The courses of actions may be determined by making predictions with respect to the likelihood that other hosts will issue similar requests in the future. The courses of action may include sending of unsolicited data to any number of hosts that did not request the unsolicited data. By providing the unsolicited data to the other hosts, it may be made less likely that the other hosts will issue requests similar to the request that prompted the sending of the unsolicited data.

FIG. 1.1 shows an example system (100) in accordance with one or more embodiments of the invention. The example system (100) may include a storage array (102) that provides data storage services. Data storage services may include storing data from clients (not shown) and providing previously stored data. The clients of the storage array (102) may be any number and any types of computing devices.

Due to the variety and/or quantity of data stored in the storage array (102), any number of entities may be interested in events that occur with respect to the data stored in the storage array (102). Such entities may desire to know when events such as, for example, when particular data is added to the storage array (102), when particular data stored in the storage array (102) is modified, when particular data already stored in the storage array (102) is removed from the storage array (102), when a configuration of the storage array (102) is modified, when the rate of data storage and/or providing of stored data changes (and/or other types of statistics regarding the operation of the storage array (102)), and/or other types of changes in the operation of the storage array (102).

Rather than waiting for the entities that desire to have knowledge regarding events that impact the data of the storage array (102) to poll the storage array (102) to obtain such information, the storage array (102) may proactively send notifications and/or data to the entities as part of providing data storage services. By doing so, the storage array (102) may reduce the computing load placed on a distributed environment in which the storage array (102) exists by reducing the amount of polling of the storage array (102) that entities may conduct in an environment in which the storage array (102) does not take proactive action.

For example, the storage array (102) may determine that when a first entity requests a status of a particular portion of data (e.g., an event that impacts the data stored in the storage array) stored in the storage array (102), two other entities may also desire to know the status of the data. In response to this determination, the storage array (102) may send information and/or data to the entities to attempt to proactively address (or more specifically mitigate) likely future polling activity that may occur.

In another example, the storage array (102) may determine that when a configuration of the storage array changes (e.g., an event that impacts use of the storage array by other entities), all entities that utilize the data storage services provided by the storage array (102) may also desire to know the configuration status of the storage array (102) when any entity request such information. In response such requests, the storage array (102) may send information and/or data to all of the entities to attempt to proactively address likely future polling activity that may occur if the entities are not proactively notified of such changes.

To facilitate the aforementioned data storage services of the storage array (102), the example system (100) may also include a message queue (104). The message queue (104) may manage messages sent between the storage array (102) and entities that may desire information regarding events that impact data stored in the storage array (102). The message queue (104) may include multiple queues for each of the entities that desire information regarding events that impact data stored in the storage array (102).

The system may further include hosts (106). The hosts (106) may desire information regarding events that impact the storage array (102). For example, the hosts (106) may be tasked with determining the status of particular data stored in the storage array (102), changes to the configuration of the storage array (102), changing use patterns of other entities that utilize the storage array (102), etc. The hosts (106) may provide the information regarding the storage array (102) to other entities (not shown) or may use the information themselves for other purposes.

The components of the system illustrated in FIG. 1 may be operably connected to each other and/or operably connected to other entities (not shown) via any combination of wired and/or wireless networks. Each component of the system illustrated in FIG. 1 is discussed below.

The storage array (102) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2-4. The storage array (102) may be other types of computing devices without departing from the invention. For additional details regarding computing devices, refer to FIG. 6.

In one or more embodiments of the invention, the storage array (102) is a distributed computing device. As used herein, a distributed computing device refers to functionality provided by multiple computing devices cooperatively providing one or more functionalities. For example, a distributed computing device may include multiple, separate computing devices that are each programmed to perform all, or a part, of the one or more functionalities. In such a scenario, the functionality of the storage array (102) may be performed by multiple, different computing devices without departing from the invention.

Figure 3:
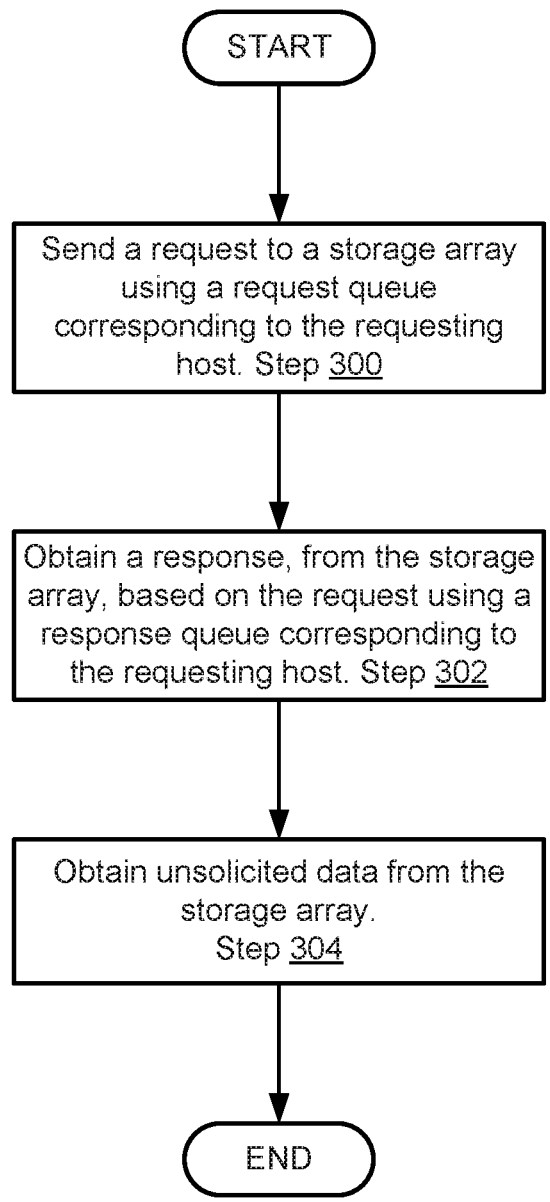
FIG. 3 shows a flowchart of a method of sending a request in accordance with one or more embodiments of the invention.
Figure 4:
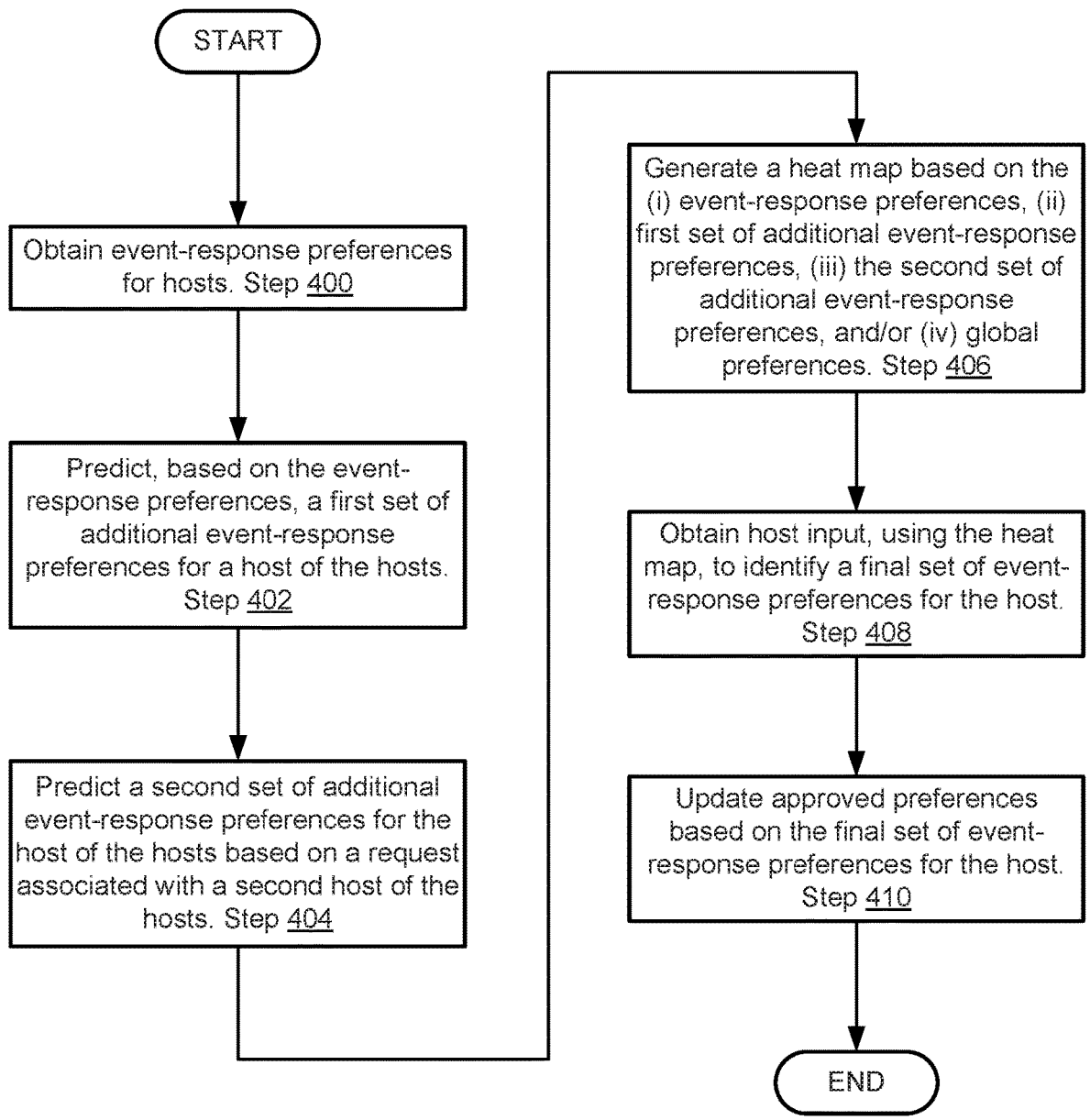
FIG. 4 shows a flowchart of a method of updating approved preferences in accordance with one or more embodiments of the invention.

To provide the functionality of the storage array (102), any of the computing devices of the storage array (102) may include computer instructions, e.g., computer code, that when executed by one or more processors of the computing devices of the storage array (102) cause the computing devices of the storage to perform the functions described in this application and/or all, or a portion, of the methods illustrated in FIGS. 2-4.

In one or more embodiments of the invention, all, or a portion, of the computing devices of the storage array (102) include special purpose computing devices. The special purpose computing devices may be, for example, storage controllers, raid controllers, load balancers, and/or any other type of special purpose computing devices for providing data storage services. The special purpose computing devices of the storage array (102) may perform different and/or similar functions. The computing devices of the storage array (102) may, when providing the functionality of the storage array (102), invoke the functionality of the special purpose computing devices.

The storage array (102) may be a logical device without departing from the invention. For example, the storage array (102) may be a virtual machine (or multiple virtual machines) that utilizes computing resources of any number of computing devices to provide the functionality of the storage array (102). The storage array (102) may be other types of logical devices without departing from the invention.

As discussed above, the storage array (102) may provide data storage services. Providing data storage services may include (i) obtaining requests from the hosts (106) and/or other entities, (ii) responding to the requests, (iii) identifying events based on the requests, and/or (iv) taking action in response to the identified events to improve the operation of the system of FIG. 1.1. By doing so, the storage array (102) may improve the efficiency of a distributed system in which the storage array (102) exists by (i) decreasing the use of network bandwidth for polling operations by the hosts (106) and/or other entities, (ii) reducing the delay between when requests are issued by hosts (106) and responses to the requests by the storage array (102), (iii) reducing utilization of resources of the storage array (102) which, consequently, improves the ability of the storage array (102) to provide data storage services (other than responding to polling), and/or (iv) reduced consumption of resources of the hosts (106) for polling operations.

To take action in response to identifying the events impacting the storage array (102), the storage array (102) may maintain preferences for each of the hosts with respect to the type of action to take in response to different types of event. To maintain the preferences, the storage array (102) may request event-response preferences from the hosts, predict other types of event-response preferences from the hosts, allow the hosts to select some of the predicted types of event-response preferences to obtain approved preferences for the respective host, and take action, as events are identified, based on the approved preferences of each of the hosts. By doing so, the storage array (102) may proactively address the likely polling workloads of the hosts (106) in the future. For additional details regarding the storage array (102), refer to FIG. 1.2.

The message queue (104) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2-4. The message queue (104) may be other types of computing devices without departing from the invention. For additional details regarding computing devices, refer to FIG. 6.

In one or more embodiments of the invention, the message queue (104) is a distributed computing device. As used herein, a distributed computing device refers to functionality provided by multiple computing devices cooperatively providing one or more functionalities. For example, a distributed computing device may include multiple, separate computing devices that are each programmed to perform all, or a part, of the one or more functionalities. In such a scenario, the functionality of the message queue (104) may be performed by multiple, different computing devices without departing from the invention.

To provide the functionality of the message queue (104), any of the computing devices of the message queue (104) may include computer instructions, e.g., computer code, that when executed by one or more processors of the computing devices of the message queue (104) cause the computing devices of the storage to perform the functions described in this application and/or all, or a portion, of the methods illustrated in FIGS. 2-4.

In one or more embodiments of the invention, all, or a portion, of the computing devices of the message queue (104) include special purpose computing devices. The special purpose computing devices may be, for example, high speed cache, high speed memory, and/or any other type of special purpose computing devices for providing message queuing services. The special purpose computing devices of the message queue (104) may perform different and/or similar functions. The computing devices of the message queue (104) may, when providing the functionality of the message queue (104), invoke the functionality of the special purpose computing devices.

The message queue (104) may be a logical device without departing from the invention. For example, the message queue (104) may be a virtual machine (or multiple virtual machines) that utilizes computing resources of any number of computing devices to provide the functionality of the message queue (104). The message queue (104) may be other types of logical devices without departing from the invention.

In one or more embodiments of the invention, the message queue (104) provides message queueing services. Providing message queueing services may include (i) obtaining a message of a type from the storage array (102) and/or the hosts (106), (ii) storing the messages in queues corresponding to the message type in a set of queues associated with a particular host (e.g., 106.2, 106.4), and/or (iii) providing messages from the queues of the message queue (104) to components of the storage array (102) and/or the hosts (106). By doing so, the message queue (104) may managing messaging between the storage array (102) and the hosts (106) to facilitate the data storage services provided by the storage array (102). For additional details regarding the message queue (104), refer to FIGS. 1.2-1.3.

The hosts (106) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2-4. The hosts (106) may be other types of computing devices without departing from the invention. For additional details regarding computing devices, refer to FIG. 6.

In one or more embodiments of the invention, the hosts (106) are distributed computing devices. As used herein, a distributed computing device refers to functionality provided by multiple computing devices cooperatively providing one or more functionalities. For example, a distributed computing device may include multiple, separate computing devices that are each programmed to perform all, or a part, of the one or more functionalities. In such a scenario, the functionality of the hosts (106) may be performed by multiple, different computing devices without departing from the invention.

To provide the functionality of the hosts (106), any of the computing devices of the hosts (106) may include computer instructions, e.g., computer code, that when executed by one or more processors of the computing devices of the hosts (106) cause the computing devices of the storage to perform the functions described in this application and/or all, or a portion, of the methods illustrated in FIGS. 2-4.

The hosts (106) may be a logical device without departing from the invention. For example, the hosts (106) may be a virtual machine (or multiple virtual machines) that utilizes computing resources of any number of computing devices to provide the functionality of the hosts (106). The hosts (106) may be other types of logical devices without departing from the invention.

In one or more embodiments of the invention, the hosts (106) provide event monitoring services. Providing event monitoring services may include (i) identifying events that may impact the storage array (102), (ii) polling the storage array (102) to determine whether any of the events have occurred, (iii) notifying other entities (e.g., applications not shown in FIG. 1.1 which may utilize the event monitoring services provided by the hosts (106)) when events occur, (iv) listening for notifications from the storage array (102) that may indicate that an event has occurred, (v) obtaining solicited data from the storage array (102) when an event occurs and/or providing the solicited data to other entities and/or providing information regarding the solicited data to other entities, and/or (vi) obtaining unsolicited data from the storage array (102) and/or providing the unsolicited data and/or information regarding the unsolicited data to other entities. By doing so, the hosts (e.g., 106.2, 106.4) may enable other entities to be efficiently notified of relevant information regarding the storage array (102). For example, the events may be when data stored in the storage array in connection with the data storage services provided by the storage array (102) is modified, when a configuration of the storage array (102) is modified, when use of the storage array by entities changes, etc. For additional details regarding the hosts (106), refer to FIG. 1.3.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention. Additionally, while the components of the system of FIG. 1.1 have been illustrated as separate, independent components, the functionality of any of the components of FIG. 1.1 may be combined into a single component without departing from the invention.

For example, the functionality of the message queue (104) and/or the functionality of the hosts (106) may be provided by the storage array (102). Alternatively, the functionality of the hosts (106) may be provided by the message Queue. Etc. The functionality of the components of FIG. 1.1 may be merged into any number of entities and/or separated out into any number of different entities without departing from the invention.

As discussed above, the storage array (102) may utilize the queue services provided by the message queue (104) when providing data storage services. FIG. 1.2 shows a diagram of an example storage array (102.2) and an example message queue (104.4) in accordance with one or more embodiments of the invention. The example storage array (102.2) may be similar to any of the storage array (102, FIG. 1) and the example message queue (104.4) may be similar to the message queue (104, FIG. 1).

To provide the aforementioned functionality of the example storage array (102.2), the example storage array (102.2) may include a storage array manager (114) and a persistent storage (116). Each component of the example storage array (102.2) is discussed below.

The storage array manager (114) may provide data storage services, as discussed above. To provide data storage services, the storage array manager (114) may include a request handler (110), an event handler (112), and a training engine (113).

The request handler (110) may (i) manage requests from entities and (ii) identify potential events based on the contents of the requests.

To manage requests from other entities, the request handler (110) may obtain the requests from request queues (e.g., 122) managed by the example message queue (104.4). The requests obtained from the request queues may be, for example, data access requests, data status requests, data modification requests, data addition requests, data removal requests, configuration change requests, configuration status requests, statistical information regarding the operation of the example storage array (102.2) (e.g., statistics regarding changing use patterns of the example storage array), and/or other types of requests related to data included in the persistent storage (116) and/or the operation of the example storage array (102.2).

Based on the requests, the request handler (110) may generate responses to the requests. The responses to the requests may be data structures that include information responsive to the requests (e.g., solicited data). The responses to the requests may be based on data included in the persistent storage (116) and/or information regarding data in the persistent storage (116) and/or information regarding a lack of data in the persistent storage (116) and/or other types of information responsive to the requests. The responses may be based on other factors (e.g., information regarding the operation of the example storage array (102.2) without departing from the invention.

For example, a request may specify that an entity desires to know a status of a particular portion of data stored in the persistent storage (116). To generate a response to the request, the request handler (110) may determine the status of the particular portion of data, generate an in-memory data structure, and populate the in-memory data structure based on the status of the particular portion of data. If the status of the particular portion of data is "unchanged since the last time the status was checked," the in-memory data structure may be populated with the aforementioned status.

The response may include, for example, information regarding the particular portion of data, all (or a portion) of the particular portion of data, access information regarding the particular portion of data, status information regarding the particular portion of data, and/or other any of types of information that may be used to satisfy a request obtained from a request queue (e.g., 122).

In another example, a request may specify a current configuration status of the example storage array (102.2). To generate a response to the request, the request handler (110) may determine the status of the configuration of the storage array (102.2), generate an in-memory data structure, and populate the in-memory data structure based on the status of the configuration. If the status of the configuration is "changed since the last time the status was checked," the in-memory data structure may be populated with the aforementioned status and/or information regarding the new configuration of the example storage array (102.2).

After generating response, the request handler (110) may provide the response to the requesting entity by adding the response to a response queue (e.g., 124) corresponding to the requesting entity. As will be discussed in greater detail below, the example message queue (104.4) may include sets of queues (e.g., 122, 124, 126, 128) corresponding to each entity that may be interested in information regarding data stored in the persistent storage (116). Consequently, the request handler (110) may respond to requests obtained from a request queue (e.g., 122) of a particular set of queues (e.g., 122, 124, 126, 128) by adding responses to the requests to the response queue (e.g., 124) of the particular set of queues from which the corresponding request was obtained.

To identify potential events based on the contents of the requests from the entities, the request handler (110) may compare each request from the entities to a list of requests. The list may specify one or more events corresponding to the type of the request. For example, the list may be a list of event-request associations (180) as illustrated in FIG. 1.7. The event-request associations (180) may be a data structure stored in the persistent storage (116) and/or other locations (e.g., in persistent storage of other devices). The event-request associations (180) may be a list of entries (e.g., 182, 184). Each of the entries (e.g., 182, 184) may specify a request type (182.2) and one or more event identifiers (182.4) of events associated with requests of the request type (182.2). The request handler (110) may match the type of the request to one of the entries of the event-request associations (180) to identify one or more events identified by the event identifier(s) (182.4) of the matched entry.

When events are identified by the request handler (110), the request handler (110) may notify the training engine (113) and/or the event handler (112) of the identified events. As will be discussed below, the training engine (113) and/or the event handler (112) may take action in response to identified events.

The event-request associations (180) may be generated by the training engine (113), as will be discussed in greater detail below. By doing so, as will be discussed in greater detail below, embodiments of the invention may proactively address potential future polling workloads by initiating action based on the identified events.

The event handler (112) may take action when the request handler (110) notifies the event handler (112) of identified events. To take action, the event handler (112) may determine a course of action to perform based on a type of the identified event. Once determined, the event handler (112) may perform the course of action.

To determine the course of action to take in response to each event, the event handler (112) may utilize approved preferences (170) for the hosts as illustrated in FIG. 1.6. FIG. 1.6 shows a diagram of the approved preferences (170) in accordance with one or more embodiments of the invention. The approved preferences (170) may be a data structures that includes information regarding the course of action to take in response to each type of event.

The approved preferences (170) may be a list of entries (e.g., 172, 174). Each of the entries may include an event identifier (172.2), a response description (172.4), and host identifier(s) (172.6). The event identifier (172.2) may specify a type of event. When the type of event specified by the event identifier (172.2) occurs, the course of action specified by the remaining portion of the entities may be performed by the event handler (112). The response description (172.4) may be a course of action to be performed in response to the occurrence of an event identified by the event identifier (172.2). The host identifier(s) (172.6) may identify one or more hosts for which the course of action specified by the response description (172.4) is to be performed. The approved preferences (170) may be generated by the training engine (113).

The course of action may be, for example, to provide unsolicited data to one or more entities and/or notify one or more entities of unsolicited data. Unsolicited data may be data for which the entities have not requested the data of the unsolicited data and/or have not requested information (e.g., status information) regarding the data of the unsolicited data. The unsolicited data may be data stored in the persistent storage (116), data that has not been stored in the persistent storage (116), and/or data regarding the operation of the example storage array (102.2) (e.g., configuration information/status, operation information/status, etc.).

For example, the unsolicited data may be a portion of the data stored in the persistent storage (116).

In another example, the unsolicited data include information regarding a status of a portion of data stored in the persistent storage (116). The status may be whether the contents of the portion of the data was modified and/or deleted during a period of time (e.g., the period of time from when a status of the portion of data stored in the persistent storage (116) had previously been provided to one or more entities).

In a still further example, the unsolicited data may include information regarding a status of a portion of data not stored in the persistent storage (116). In other words, the information may be that the portion of data has not yet been stored in the persistent storage (116).

In yet another example, the unsolicited data may include information regarding the configuration of the example storage array (102.2). In other words, the unsolicited data may provide information regarding how the example storage array (102.2) is currently and/or was previously operating and/or will be operating in the future.

The unsolicited data may include other types of information without departing from the invention.

To notify the one or more entities of the unsolicited data, the event handler (112) may generate an event. The event may be an in-memory data structure that includes information regarding the unsolicited data. The information regarding the in-memory data structure may include, for example, an identifier of the unsolicited data, a description of the contents of the unsolicited data, access information for the unsolicited data, and/or other information that may be used by the entities to decide whether to access and/or obtain additional information regarding the unsolicited data.

Additionally, the event handler (112) may add the event to one or more event queues (e.g., 126) corresponding to the one or more entities that the event handler (112) identified as part of the course of action. By doing so, as will be discussed in greater detail below, the one or more entities may be notified of the unsolicited data by being provided with the generated event.

Similarly, the one or more entities may be provided with the unsolicited data either directly or indirectly. If provided with the unsolicited data directly, the event handler (112) may add the unsolicited data to one or more event data queues (e.g., 128) corresponding to the one or more entities. If provided indirectly, the event handler (112) may add information to the event (provided to the one or more entities via the event queues (e.g., 126)) indicating that the one or more entities should retrieve the unsolicited data from the example storage array (102.2).

Returning to FIG. 1.2, the training engine (113) may maintain the approved preferences (170, FIG. 1.6) and the event-request associations (180, FIG. 1.7). To do so, the training engine (113) may (i) obtain event-response preferences from hosts, (ii) maintain host specified event-response preferences (e.g., 150, FIG. 1.4, discussed below), (iii) predict a first set of one or more additional preferences for a host based on the host specified event-response preferences, (iv) predict a second set of one more additional preferences based on requests from the hosts, (v) generate a heat map based on the aforementioned preferences of (i), (ii), (iii), and/or global preferences (e.g., 160, FIG. 1.5, discussed below), (vi) obtain host feedback using the heat map, and (vii) generate the approved preferences (170, FIG. 1.6) based on the feedback.

The training engine (113) may predict the first set of one or more additional preferences for the host by identifying other hosts with similar event-response associations. The training engine (113) may compare the preferences of the host to the preferences of the other hosts to identify a difference between the preferences. The training engine (113) may use the difference between the preferences as the first set of one or more additional preferences.

For example, consider a scenario where a host has the following preference: (a) when a configuration status inquiry is obtained, provide the result of the configuration status inquiry. A second host has the following preferences: (a) when a configuration status inquiry is obtained, provide the result of the configuration status inquiry and (b) when a request to modify a configuration of the storage array is obtained, provide a description of the modification. The training engine (113) may identify the difference as (b) when a request to modify a configuration of the storage array is obtained, provide a description of the modification. The training engine (113) may use the (b) when a request to modify a configuration of the storage array is obtained, provide a description of the modification as the first set of one or more additional preferences for the host.

The training engine (113) may predict the second set of one or more additional preferences for the host by using a learning model. The learning model may be, for example, a neural network that predicts, based on requests from other hosts, whether the host would desire a particular response.

For example, the neural network may use as a training basis: (i) any number of past requests from hosts and (ii) the similarity between the respective hosts and the host. The result of training the neural network may be a function that takes, as input, future requests obtained from the hosts. The output of the function may be a prediction of whether the host (for which the function is making a prediction) will desire access to information included in a response based on the request in the future. The prediction may be used (e.g., added to the second set) as the second set of one or more additional preferences. The function may be used, as requests are received from the hosts, to populate the second set of one or more additional preferences.

Other types of learning models, other than a neural network, may be used to generate the second set of one or more additional preferences without departing from the invention.

To generate the heat map based on the aforementioned preferences of (i), (ii), (iii), and/or global preferences (e.g., 160, FIG. 1.5, discussed below), the training engine (113) may generate a graphical representation of the aforementioned preferences of (i), (ii), (iii), and/or global preferences. The resulting graphical representation may include representations of (ii), (iii), and the global preferences which are all preferences regarding responses to events identified by the request handler (110) which the host, for which the heat map is generated, did provide. Consequently, the resulting heat map may include any number of types of event-response preferences which the host did not provide.

The heat map may be an interactive graphical representation in that a user of the host may interact with the heat map to provide feedback. For example, the user may provide feedback to indicate that any number of the event-response preferences (e.g., those not provided by the host) are not approved by the host. Thus, the heat map be used to obtain feedback from the user of the host regarding event-response preferences that should be reflect in the approved preferences (170, FIG. 1.6).

To generate the approved preferences, the training engine (113) may maintain the approved preferences by ensuring that the approved preferences reflect the feedback for each host obtained using any number of heat maps.

For example, when feedback from a host is obtained using a heat map, the event-response preferences approved by the user as identified by the feedback from the host is used to update the approved preferences (170). The approved preferences (170) may be updated by adding new entries, modifying existing entries, and/or removing entries.

An entry of the approved preferences may be modified by, for example, adding or removing a host identifier corresponding to the host to the host identifier(s) (e.g. 172.6, FIG. 1.6) of the entry. An entry of the approved preferences may be added by, for example, generating a new entry, adding an event identifier based on an approved event-response preference, adding a response description based on the approved event-response preference, and/or adding host identifier(s) based on the approved event-response preference, etc.

To maintain the event-request associations (180, FIG. 1.7), the training engine (113) may data mine the requests obtained from the hosts. To data mine the requests, the training engine (113) may keep track of the requests issued by the hosts over time as multiple requests issued by a host may indicate that an event has occurred.

For example, a host may first issue a request for a status of a configuration of the storage array. After receiving a response, the host may issue a second request for a list of changes to the configuration of the storage array over a predetermined amount of time. After receiving a response to the second request, the host may issue a third request for statistics regarding the operation of the host over the predetermined amount of time. Based on the aforementioned requests, the host may determine that receiving a request for a status of a configuration results in the occurrence of three event for which the event handler should response: configuration status event, configuration change event, and statistics status event.

Upon the identification of a request-event(s) relationship, the training engine (113) may modify event-request associations (180, FIG. 1.7) to reflect the request-event(s) relationship. By doing so, when a request of the type specified by the entry occurs in the future, the request handler (110) may notify the event handler (112) of the corresponding event. Doing so enables the event handler (112) to take appropriate action, as discussed above.

While the training engine (113) has been illustrated as being a portion of the storage array manager (114), the training engine (113) may offload all, or a portion, of its functionality to other entities. For example, the training engine (113) may offload the use of learning models (e.g., neural networks) for prediction generation to other entities. Use of such models may be computationally expensive. By offloading such functionality to other entities, the computing resources of the example storage array (102.2) may be directed toward addressing the data storage service needs of the hosts.

To provide the above noted functionality of the storage array manager (114), the storage array manager (114) may perform all, or a portion, of the methods illustrated in FIGS. 2-4. For example, the request handler (110) and/or the event handler (112) of the storage array manager (114) may perform all, or a portion, of the aforementioned methods.

In one or more embodiments of the invention, the storage array manager (114) is a hardware device including circuitry. The storage array manager (114) may be, for example, a digital signal processor, a field programmable gate array, or an application specific integrated circuit. The storage array manager (114) may be other types of hardware devices without departing from the invention.

In one or more embodiments of the invention, the storage array manager (114) is implemented as computing code stored on a persistent storage that when executed by a processor performs the functionality of the storage array manager (114). The processor may be a hardware processor including circuitry such as, for example, a central processing unit or a microcontroller. The processor may be other types of hardware devices for processing digital information without departing from the invention.

In one or more embodiments of the invention, the functionality of the storage array manager (114) is provided by special purpose hardware devices. For example, the storage array manager (114) may be implemented as computing code stored on a persistent storage that when executed by a processor performs the functionality of the storage array manager (114). When executing the computing code stored on the persistent storage, the processor may invoke functionality of one or more special purpose hardware devices that gives rise to a portion of the functionality off the storage array manager (114). The special purpose hardware device may be, for example, a programmable gate array, application specific integrated circuit, digital signal process, or other type of hardware device operably connected to the processor.

In one or more embodiments of the invention, the persistent storage (116) provides data storage resources for the example storage array (102.2) and/or other entities. The data storage resources may enable the example storage array (102.2) to persistently store digital data. The persistent storage (116) may store data structures including information regarding data for which the example storage array (102.2) is providing data storage services, the host specified event-response preferences (150, FIG. 1.4), the global preferences (160, FIG. 1.5), the approved preferences (170), and the event-request associations (180). The persistent storage (116) may store addition, different, and or less data without departing from the invention. The example storage array (102.2) may be a physical storage device or a logical storage device.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

Returning to FIG. 1.4, FIG. 1.4 shows a diagram of host specified event-response preferences (150) in accordance with one or more embodiments of the invention. The host specified event-response preferences (150) may be a data structure that includes information regarding event-response preferences provided by a host. In other words, event-response preferences that the host desires to be used.

The host specified event-response preferences (150) may include any number of entries (e.g., 152, 154). Each of the entries may include information regarding a corresponding event-response preference provided by the host.

For example, each of the entries (e.g., 152, 154) may include a host identifier (152.2) that identifies the host providing the preferences, an event description (152.4) that describes the event for which the event-response preference is provided, and/or a request description (152.6) that describes the actions that the host requests be performed when the event described by the event description (152.4) occurs. To provide a specific example, an event-response preference may be that when the storage array obtain a request for its configuration information, that the host also provide a copy of the configuration information to the host. In another specific example, an event-response preference may be that when the storage array obtains a request for a status update of a portion of data for which the storage array is providing data storage services, that the host be provided the status of the portion of the data in addition to providing the status to the requesting entity.

Thus, the host specified event-response preference (150) may include event-response preferences associated with the host. Similarly, the global preference (160) shown in FIG. 1.5 may include information regarding event-response preferences that may be attempted to be used with respect to all hosts.

FIG. 1.5 shows a diagram of global preference (160) in accordance with one or more embodiments of the invention. The global preferences (160) may be a data structure that includes information regarding event-response preferences that have been determined as should be adopted for all hosts. In other words, event-response preferences that should be used for all hosts unless the hosts explicitly exclude the event-response preferences.

The global preferences (160) may include a configuration change event-response preference (162.2) that specifies that all hosts should be notified of configuration change information whenever such information is requested by any of the hosts.

The global preferences (160) may include a resource limit change event-response preference (162.4) that specifies that all hosts should be notified of computing resource limits whenever such information is requested by any of the hosts.

The global preferences (160) may include a statistical inferences change event-response preference (162.6) that specifies that all hosts should be notified of statistical information regarding operation of the storage array whenever such information is requested by any of the hosts. The statistical information may be, for example, the rate at which data is being stored in or provided by the storage array at a point(s) in time. The statistical information may be other statistics regarding the operation of the storage array without departing from the invention.

While the example storage array (102.2) of FIG. 1.2 has been described and illustrated as including a limited number of components for the sake of brevity, a storage array in accordance with embodiments of the invention may include additional, fewer, and/or different components than those illustrated in FIG. 1.2 without departing from the invention.

As discussed above, the example message queue (104.4) may provide message queueing services. To provide the aforementioned functionality of the example message queue (104.4), the example message queue (104.4) may include any number of message queue sets (e.g., 120.2, 120.4).

Each of the respective message queue sets (e.g., 120.2) may be associated with a corresponding host. In other words, each of the separate message queue sets (e.g., 120.2) may provide queueing services for a corresponding host. The example message queue (104.4) may include additional message queue sets for providing message queueing services to any number of other entities without departing from the invention.

Each of the respective message queue sets (e.g., 120.2) may include a request queue (122), a response queue (124), an event queue (126), and an event data queue (128). The request queue (122) and the response queue (124) may manage messages between the request handler (110) and a corresponding host. The event queue (126) and the event data queue (128) may manage messages and/or data sent from the event handler (112) to a corresponding host. Each of the queues (e.g., 122, 124, 126, 128) of the message queue sets (120.2, 120.4) is discussed below.

A queue may be (i) a data structure for storing information in a particular order and (ii) management of the data structure that ensures an entity for which the queue exists is provided information from the data structure in a particular order. For example, a queue may be a first in, first out quest; a last in, first out queue, a buffer, or another type of information management entity that temporarily stores information. The information may be temporarily stored to provide an entity for which the queue exists appropriate time for processing the information.

For example, a queue may include a data structure that orders messages received from an entity in an order corresponding to the temporal order in which the messages were received by the queue. Management of the queue may ensure that the entity, for which the queue exists, is provided the messages in the same temporal order but at different point in time from which the messages were received.

To provide for management of the queue, each queue may include an application (e.g., computer code being executed by a processor) that provides for management of the queue in a manner consistent with a type of the queue (e.g., orders messages stored in a data structure in an order consistent with the queue type). However, the queue may not include active components without departing from the invention. For example, the queue may be implemented as a data structure that other entities may read and/or write to. The other entities may be programmed to store message and/or data in an order within the data structure consistent with the queue type. The entity, for which the queue exists, may be programmed to read data from the queue in a manner consistent with the queue type.

The request queue (122) may be a queue for managing requests sent from a corresponding host to the request handler (110). The requests may indicate that the corresponding host desires information regarding a portion of data stored in the persistent storage (116). The requests may indicate that the corresponding host desires any type of information regarding any type and any quantity of data of the persistent storage. The request handler (110) may read messages from the request queue (122) and take appropriate action in response to reading the messages.

The response queue (124) may be a queue for managing responses sent from the request handler (110) to a corresponding host in response to messages that the request handler (110) read from the request queue (122). The responses may include information responsive to the requests that the request handler (110) read from the request queue (122). The responses may include (i) responsive information to a request and/or and (ii) information that enables an entity reading a response to ascertain which particular request the response has been sent in response to the particular request. A host, corresponding to the response queue (124) may read the responses in the response queue (124). For additional details regarding responses and requests, refer to FIG. 1.3.

The event queue (126) may be a queue for managing events sent from the event handler (112) to a corresponding host in response to identifying that an event has occurred. As noted above, the request handler (110) may notify the event handler of the occurrence of events. An event may include information that may enable a host corresponding to the event queue (126) to determine whether to obtain unsolicited data and/or to obtain the unsolicited data. For example, an event may include information regarding the unsolicited data and/or access information for the unsolicited data.

The event handler (112) may send copies of an event to any number of event queues (126). Consequently, any number of hosts (e.g., one host, multiple hosts), corresponding to event queues in which the event handler (112) added an event, may be notified of the occurrence of a particular event. Hosts corresponding to the event queues (e.g., 126) may read the events of the event queues (e.g., 126).

The event data queue (128) may be a queue for managing sending of unsolicited data from the event handler (112) to a corresponding host in response to identifying that an event has occurred. As noted above, the request handler (110) may send unsolicited data in response to the occurrence of events. However, the event data queue (128) may only be able to provide queueing services for unsolicited data of up to a maximum size. If unsolicited data exceeds the maximum size, the unsolicited data may not be provided to a host corresponding to the event data queue (128). Hosts corresponding to the event data queues (e.g., 128) may read the unsolicited data of the event data queues (e.g., 128).

In one or more embodiments of the invention, the message queue sets (e.g., 120.2, 120.4) are hardware devices including circuitry. The message queue sets (e.g., 120.2, 120.4) may be, for example, digital signal processors, field programmable gate arrays, or application specific integrated circuits. The message queue sets (e.g., 120.2, 120.4) may be other types of hardware devices without departing from the invention.

In one or more embodiments of the invention, the message queue sets (e.g., 120.2, 120.4) are implemented as computing code stored on a persistent storage that when executed by a processor performs the functionality of the message queue sets (e.g., 120.2, 120.4). The processor may be a hardware processor including circuitry such as, for example, a central processing unit or a microcontroller. The processor may be other types of hardware devices for processing digital information without departing from the invention.

In one or more embodiments of the invention, the functionality of the message queue sets (e.g., 120.2, 120.4) is provided by special purpose hardware devices. For example, the message queue sets (e.g., 120.2, 120.4) may be implemented as computing code stored on a persistent storage that when executed by a processor performs the functionality of the message queue sets (e.g., 120.2, 120.4). When executing the computing code stored on the persistent storage, the processor may invoke functionality of one or more special purpose hardware devices that gives rise to a portion of the functionality off the message queue sets (e.g., 120.2, 120.4). The special purpose hardware device may be, for example, a programmable gate array, application specific integrated circuit, digital signal process, or other type of hardware device operably connected to the processor.

While the example message queue (104.4) of FIG. 1.2 has been described and illustrated as including a limited number of components for the sake of brevity, a storage array in accordance with embodiments of the invention may include additional, fewer, and/or different components than those illustrated in FIG. 1.2 without departing from the invention.

As discussed above, the example message queue may provide queue services to hosts. FIG. 1.3 shows a diagram of the example message queue (104.4) and example hosts (e.g., 130, 132) in accordance with one or more embodiments of the invention. The example hosts (e.g., 130, 132) may be similar to the hosts (106, FIG. 1).

As discussed with respect to FIG. 1.1, the example hosts (e.g., 130, 132) may provide event monitoring services for other entities (not shown). By doing so, the other entities may be notified of changes, or the lack of changes, to data stored in persistent storage of a host array. The other entities may also be notified of changes in the operation of the storage array (102, FIG. 1.1).

To provide the aforementioned functionality of the example hosts (e.g., 130, 132), each of the example hosts may include an event concerned agent. Each component of the example hosts (e.g., 130, 132) is discussed below.

The event concerned agent (144) may be an entity tasked with monitoring the status of data stored in a storage array. To do so, the event concerned agent (144) may send and/or receive messages and/or data via the example message queue (104.4).

The event concerned agent (144) may include an agent application programming interface (146) for sending and receiving messages via the request queue (122) and the response queue (124). The agent application programming interface (146) may enable other entities to transmit and receive messages via these queues.

For example, the agent application programming interface (146) may obtain requests from other entities for sending requests via the request queue (122). In response, the agent application programming interface (146) may generate queue compliant requests for information from the storage array. Similarly, the agent application programming interface (146) may obtain response, to previously sent requests, from the response queue (124). The agent application programming interface (146) may extract relevant information from the responses and provide the extracted information to other entities. The other entities may include, for example, the agent event listener (148). The other entities may include additional entities, other than the agent event listener (148), without departing from the invention.

The event concerned agent (144) may also include an agent event listener (148) that may be an entity tasked with monitoring events and/or data (i.e., unsolicited data) received via the event queue (126) and/or the event data queue (128), respectively. The agent event listener (148) may take action in response to obtaining events and/or data via these queues.

For example, the agent event listener (148) may provide data (i.e., unsolicited data) and/or information regarding data obtained from the event data queue (128) to other entities for which the respective example hosts are providing services (the entities may be, for example, application hosted by other devices that utilize such information as part of their normal operation). Similarly, the agent event listener (148) may provide all, or a portion, of the information included in events obtained from the event queue (126) to other entities for which the respective example hosts are providing services. The agent event listener (148) may also, if warranted, obtain unsolicited information using information included in the events. The agent event listener (148) may provide the data (i.e., the unsolicited data it obtained) and/or information regarding data to other entities for which the respective example hosts are providing services.

In one or more embodiments of the invention, the event concerned agent (144) is a hardware device including circuitry. The event concerned agent (144) may be, for example, a digital signal processor, a field programmable gate array, or an application specific integrated circuit. The event concerned agent (144) may be other types of hardware devices without departing from the invention.

In one or more embodiments of the invention, the event concerned agent (144) is implemented as computing code stored on a persistent storage that when executed by a processor performs the functionality of the event concerned agent (144). The processor may be a hardware processor including circuitry such as, for example, a central processing unit or a microcontroller. The processor may be other types of hardware devices for processing digital information without departing from the invention.

In one or more embodiments of the invention, the functionality of the event concerned agent (144) is provided by special purpose hardware devices. For example, the event concerned agent (144) may be implemented as computing code stored on a persistent storage that when executed by a processor performs the functionality of the event concerned agent (144). When executing the computing code stored on the persistent storage, the processor may invoke functionality of one or more special purpose hardware devices that gives rise to a portion of the functionality off the event concerned agent (144). The special purpose hardware device may be, for example, a programmable gate array, application specific integrated circuit, digital signal process, or other type of hardware device operably connected to the processor.

While the example hosts (e.g., 130, 132) of FIG. 1.3 have been described and illustrated as including a limited number of components for the sake of brevity, a host in accordance with embodiments of the invention may include additional, fewer, and/or different components than those illustrated in FIG. 1.3 without departing from the invention.

Additionally, while the data structures illustrated in FIGS. 1.4-1.7 have been described as shown as including a limited amount of specific information, the data structures may include additional, different, and/or less information without departing from the invention. Further, while the data structures have been described as being separate, distinguishable data structures stored in specific locations, the data structure may be subdivided into any number of data structures, combined with other data structures, stored in different, and/or spanned across any number of devices without departing from the invention.

Returning to FIG. 1.1, the storage array (102) may provide data storage services to any number of entities. FIG. 2 illustrates a method that may be performed by the storage array (102) of the system of FIG. 1.1 when providing data storage services.

FIG. 2 shows a flowchart of a method in accordance with one or more embodiments of the invention. The method depicted in FIG. 2 may be used to respond to a request in accordance with one or more embodiments of the invention. The method shown in FIG. 2 may be performed by, for example, a storage array (e.g., 110, FIG. 1). Other components of the system illustrated in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a request, from a requesting host, is obtained using a request queue corresponding to the requesting host.

In one or more embodiments of the invention, the request is for solicited data that is obtained by obtaining the next request to be processed as specified by the request queue. For example, the request queue may specify an order for processing multiple requests in the request queue. The request may be the next request of the requests to be processed as specified by the processing order specified by the request queue.

The solicited data may include any type of information regarding the storage array. For example, the solicited data may be a status of the storage array, a status of data hosted by the storage array, a configuration of the storage array, etc.

In step 202, the request is responded to using a response queue corresponding to the requesting host.

The request may be responded to based on the solicited data. For example, a response may be generated using the solicited data and added to a response queue corresponding to the requesting host.

In step 204, is determined whether the request matches a request type specified in event-request associations.

The event-request associations may be similar to that illustrated in FIG. 1.7. The determination may be made by comparing a type of the request to request types specified by each of the entries of the event-request associations. If a match is identified, the request is determined as matching.

If the request matches any of the request types of the event-request associations, the method proceeds to step 206. If the request does not match any of the request types of the event-request associations, the method may end following step 204.

In step 206, events are generated based on the request type using the event-request associations.

The events may be generated based on event types specified by a matched entry of the event-request associations. As discussed above, each request type specified by the event-request associations may be associated with one or more events. Thus, if a match to a request type specified by the event-request associations, the storage array may generate events based on the events specified by the match.

In Step 208, responses are performed based on the types of the events generated in step 206 using approved preferences.

The approved preferences may be similar to that illustrated in FIG. 1.6. As discussed above, the approved preferences may specify courses of action (i.e., performing responses such as providing unsolicited data to one or more hosts) to be perform when an event is identified. The courses of actions may be performed by the storage array in response to the events generated in Step 206.

The method may end following step 208.

Thus, via the method illustrated in FIG. 2, embodiments of the invention may provide a method for providing data storage services that decreases the likelihood of multiple hosts sending multiple duplicative requests to a storage array. By doing so, the use of computational resources within the distributed system may be reduced when compared to providing different types of data storage services.

Returning to FIG. 1.1, the hosts (106) may utilize data storage services provided by a storage array (102). FIG. 3 illustrates a method that may be performed by the hosts (106) of the system of FIG. 1.1 when utilizing data storage services.

FIG. 3 shows a flowchart of a method in accordance with one or more embodiments of the invention. The method depicted in FIG. 3 may be used to obtain solicited data in accordance with one or more embodiments of the invention. The method shown in FIG. 3 may be performed by, for example, hosts (e.g., 106, FIG. 1.1). Other components of the system illustrated in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a request is sent to a storage array using request queue corresponding to the requesting host.

In one or more embodiments of the invention, the request is for solicited data. The solicited data may be, for example, a status of the storage array, information regarding data stored in the storage array, or any other type of information regarding the operation of the storage array.

In one or more embodiments of the invention, the request for the solicited data is sent to the storage array using the request queue by adding the request to the request queue.

In one or more embodiments of the invention, the request for solicited data is sent in response to a request from another entity for which the host is providing services. For example, the host may be monitoring the storage array at the request of another entity. The host may send a request for solicited data to provide the monitoring services of the storage array for the another entity.

In step 302, a response, from the storage array, that is based on the request is obtained using a response queue corresponding to the requesting host.

As discussed above, there may be a request queue and response queue for each of the hosts. Thus, when a request is sent to the storage array using request queue, a response to the request from the storage array may be received via the response queue corresponding to the request queue. For example, the response queue over which the request of step 300 was sent may be part of a message queue set that also includes the response queue.

In one or more embodiments of the invention, the response is obtained by obtaining the next to be processed response from the response queue.

In one or more embodiments of the invention, the response is based on the solicited data because the storage array generated the response based on the request for the solicited data.

In step 304, unsolicited data is obtained from the storage array.

The unsolicited data may include any type and/or quantity of data. The unsolicited data may include any type of contents. The contents may be, for example, information regarding the status of the storage array, information regarding a portion of data hosted by the storage array, information regarding the operation of the storage array, etc.

The method may end following step 304.

Thus, via the method illustrated in FIG. 3, embodiments of the invention may provide a method for obtaining solicited data that decreases the likelihood of multiple hosts sending multiple duplicative requests to a storage array. For example, the host may obtain unsolicited data in addition to the solicited data that may proactively satisfy a potential future request. By doing so, the use of computational resources within the distributed system may be reduced when compared to obtaining solicited data via other methods.

Returning to FIG. 1.1, the storage array (102) may maintain approved preferences (170, FIG. 1.6) to provide data storage services. FIG. 4 illustrates a method that may be performed by the storage array (102) of the system of FIG. 1.1 when providing data storage services.

FIG. 4 shows a flowchart of a method in accordance with one or more embodiments of the invention. The method depicted in FIG. 4 may be used to provide data storage services in accordance with one or more embodiments of the invention. The method shown in FIG. 4 may be performed by, for example, the storage array (e.g., 102, FIG. 1.1). Other components of the system illustrated in FIG. 1.1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, event-response preferences are obtained from hosts.

In one or more embodiments of the invention, the event-response preferences are obtained via a message from each of the hosts. The message may include the event-response preferences. The event-response preferences may be similar to those illustrated in FIG. 1.6.

In one or more embodiments of the invention, the storage array requests the event-response preferences from the hosts. For example, the storage array may send requests for the event-response preferences of each host to the respective hosts. In response, each respective host may provide their respective event-response preferences.

In step 402, a first set of additional event-response preferences for a host of the hosts is predicted based on the event-response preferences.

In one or more embodiments of the invention, the first set of additional event-response preferences for the host is predicted by matching the host to a second host (e.g., finding a second host with event-response preferences similar to the host's event-response preferences), identifying differences between the host's event-response preferences and the second host's event-response preferences, and using the differences as the basis for the first set of event-response preferences.

In step 404, a second set of additional event-response preferences for the host of the hosts is predicted based on a request associated with a second host of the hosts.

As discussed above, the storage array may use a learning model to generate a functional relationship between the requests associated with other hosts and the likelihood that the host of the hosts is interested in obtaining information similar to that requested by the requests. The function may be used to generate the event-response preferences of the second set of additional event-response preferences by monitoring requests from other hosts. Based on the requests, the second set of additional event-response preferences for the host may be generated.

The first set of additional event-response preferences and the second set of additional event-response preferences may each include any number of event-response preferences for the host.

In step 406, a heat map is generated based on (i) the event-response preferences obtained in step 400, (ii) the first set of additional event-response preferences, (iii) the second set of additional event-response preferences, and/or (iv) a global preferences.

As discussed above, each of these data structures of (i)-(iv) may include any number of event-response preferences. The heat map may be a graphical representation of these event-response preferences. The heat map may be an interactive graphic representation that enables a host to provide feedback using the heat map. The feedback from the host may indicate that all, or a portion, of the event-response preferences represented by the heat map are approved by the host. Thus, a portion of the feedback from the host may indicate that a second portion of the event-response preferences represented by the heat map are not approved by the host.

The heat map may be any type of graphical representation. For example, the heat map may be a two-dimensional plot that indicates the type and quantity of event-response preferences that the host may or may not approve. The two-dimensional plot may allow the user to indicate that any number of the event-response preferences are approved and/or are not approved.

For example, the two-dimensional plot may track cursor movement, cursor clicks, may enable input to be provided, and/or may allow for any other type of information entry by the host to indicate approval of all or a portion of the event-response preferences as being approved or disapproved.

In step 408, host input is obtained using the heat map to identify a final set of event-response preferences for the host. The final set of event responses for the host may be all of the event-response preferences that the host has approved via the host input.

As discussed above, the host input may be any type of input such as, for example, movement of the cursor, input of data via keyboard, or any type of information entry.

In step 410, approved preferences are updated based on the final set of event-response preferences for the host.

In one or more embodiments of the invention, the approved preferences are updated by modifying the approved preferences to reflect the event-response preferences specified by the final set of event-response preferences for the host. For example, an entry of the approved preferences corresponding to the type of an event may be updated by adding an identifier of the host to one or more identifiers of other hosts included in the entry. By doing so, the approved preferences may be updated to cause the storage array to include the host and courses of action performed in response to the occurrence of events matching the event type of the entry.

The method may end following step 410.

Thus, via the method illustrated in FIG. 4, embodiments of the invention may provide a method for managing approved preferences. The method may enable the host to consider the use of additional event-response preferences when electing to approve event-response preferences. By doing so, the storage array may proactively address potential future polling workloads that the host would impose on the storage array absent the additional event-response preferences approved by the host.

To further clarify embodiments of the invention, a non-limiting example is provided in FIGS. 5.1-5.10. Each of these figures may illustrate a similar system and/or data used by a similar system to that illustrated in FIG. 1.1 at different points in times. For the sake of brevity, only a limited number of components of the system of FIG. 1.1 are illustrated in each of FIGS. 5.1-5.10.

Example

Consider a scenario as illustrated in FIG. 5.1 in which a storage array (500) is providing data storage services to a first host (504) and a second host (506) using a message queue (502). The first host (504) has been newly added to the system illustrated in FIG. 5.1.

In response to the addition of the first host (504), the storage array (500) initiates the process of obtaining approved preferences for the first host (504). As part of the process, the storage array (500) requests first host specified event-response preferences (520), as illustrated in FIG. 5.2, from the first host (504). The first host specified event-response preferences (520) includes a first entry (522) that indicates an event-response preference. The entry includes data including a first host identifier (522.2), a database 1 change (522.4), and a notify host (522.6). This data indicates that when database 1 is changed (e.g., database 1 change), the first host (e.g., first host identifier) is to be notified (e.g., notify host).

The storage array (500) determines that the first host (504) has event-response preferences that are similar to those of the second host (506). FIG. 5.3 show a diagram of the second host specified event-response preferences (530) that were provided by the second host (506) to the storage array (500). The second host specified event-response preferences (530) includes a first entry (532) and a second entry (534).

The storage array (500) determines that the first host (504) and the second host (506) have similar preferences because the first entry of each of the aforementioned event-response preferences (e.g., 520, 530) is similar. For example, the first entry (532) of the second host specified event-response preferences (530) indicates that a similar course of action should be provided for the second host (e.g., second host identifier (532.2)).

Using the first and second host specified event-response preferences (e.g., 520, 530), the storage array (500) identifies a first set of additional event-response preferences based on the differences between these event-response preferences (e.g., 520, 530). As seen from FIGS. 5.2 and 5.3, a second entry (534) is included in the second host specified event-response preferences (530). The second entry includes data including a second host identifier (534.2), a database 2 change (534.4), and a notify host (534.6). This data indicates that when database 2 is changed (e.g., database 2 change), the second host (e.g., second host identifier) is to be notified (e.g., notify host). Thus, the first set of additional event-response preferences includes information similar to the second entry (534).

After identifying the first set of additional event-response preferences, the storage array (500) identifies a second set of additional event-response preferences for the first host (504). To do so, the storage array (500) monitors requests obtained from the other hosts (e.g., 506).

During the monitoring, the second host (506) sends a request (510) to the storage array (500) using the message queue (502) as illustrated in FIG. 5.4. The request (510) indicates that the second host (506) desires to be provided with status of the image file stored in the storage array (500). In response to receiving the request (510), the storage array (500) determines that the image file is unavailable and sends a response (512) to the second host (506) via the message queue (502) as illustrated in FIG. 5.5. The response (512) indicates that the image file is unavailable.

Information regarding the request (510) and the response (512) are provided to a function generated by a learning model employed by the storage array (500) to predict whether the first host (504) may desire to have access to similar information provided in response (512). Using the function, the storage array (500) determines that the first host (504) would likely desire access to such information. In response to the determination, the storage array (500) adds an event-response preference to the second set of additional event-response preferences reflecting the determination. Specifically, the added event-response preference indicates that the first host (504) requests that, when any host requests information regarding the image file, the storage array (500) provides information (i.e., unsolicited data) regarding the image file to the first host (504).

Using the first host specified event-response preferences (520, FIG. 5.2), the first set of additional event-response preferences, the third set of additional event-response preferences, and global preferences (not shown) that specify that all hosts are to be notified of configuration changes when configuration change requests are received by the storage array (500, FIG. 5.1), the storage array (500, FIG. 5.1) generates a heat map as illustrated in FIG. 5.6.

As seen from FIG. 5.6, the heat map includes different heat map portions (540) corresponding to the event-response preferences in all of the aforementioned data structures. For example, the heat map includes a portion corresponding to requests for information regarding database 1, database 2, the image file, and configuration changes. The heat map is divided into different categories (e.g. "data stored in storage array", "storage array information"). Each of the heat map portions (540) are sized to reflect the relative magnitude of the information included in each category (e.g., the portions corresponding to the "data stored in storage array" category are larger than the portion corresponding to the "storage array information" category).

After generating the heat map, the storage array (500) causes the heat map to be displayed to a user of the first host (504). While displayed to the user of the first host (504), the user utilizes a cursor (550) to provide feedback regarding which of the graphically illustrated user-response preferences the user approves as shown in FIG. 5.7. Specifically, the user sequentially positions the cursor (550) at each of the locations indicated by the circles and selects each of the portions of the heat map at each of the aforementioned locations. To do so, the user causes the cursor (550) to traverse the path illustrated by the arrows with dashed tails in FIG. 5.7.

Because the user selected each of the portions of the heat map, the user indicated that the user approves of the event-response preferences corresponding to each of the selected portions of the heat map (i.e., all of the event-response preferences in this example).

Using the feedback from the user of the first host (504), the storage array (500) updates the approved preferences (568) as seen in FIG. 5.8. The approved preferences (568) require that (i) when a request for a configuration change is obtained by the storage array, the first host is notified; (ii) when a request to determine whether database 1 has changed is obtained by the storage array, the first host is notified and the second host is notified; (ii) when a request to determine whether database 2 has changed is obtained by the storage array, the first host is notified and the second host is notified; (ii) when a request to determine whether the image file has changed is obtained by the storage array, the first host is notified.

After updating the approved preferences, the storage array (500) begins to provide services to the first host (504) and the second host (506) as illustrated in FIG. 5.9. After the storage array (500) begins to provide the services, the second host (506) sends a request (570) requesting a status of the image file stored in the storage array (500).

In response to receiving the request (570), the storage array (500) sends a response (572) to the second host (506) as illustrated in FIG. 5.10. The response (572) indicates that the image file is now available.

Additionally, the storage array (500), using the approved preferences (568, FIG. 5.8), identifies that an event has occurred. Specifically, a status check for the image file. In response, a request handler (not shown) of the storage array (500) generates a corresponding event (i.e., an image file change event) and sends the event to an event handler (not shown) of the storage array (500). In response to the image file change event, the event handler determines that a course of action is to be performed because the approved preferences (568, FIG. 5.8) include an event type of image file change ("image file change"). In this case, the course of action is to notify the first host (504) of the change.

To do so, the event handler generates unsolicited data (574) and sends unsolicited data to the first host (504). The unsolicited data (574) includes the notification regarding the image file as specified in the approved preferences (568, FIG. 5.8). For example, the unsolicited data (574) may include a copy of the image file.

By doing so, because the storage array (500) was aware that the first host (504) would likely poll the storage array (500) regarding the image file in the future, the storage array (500) proactively addressed the likely future polling workload of the first host (504).

End of Example

Figure 6:
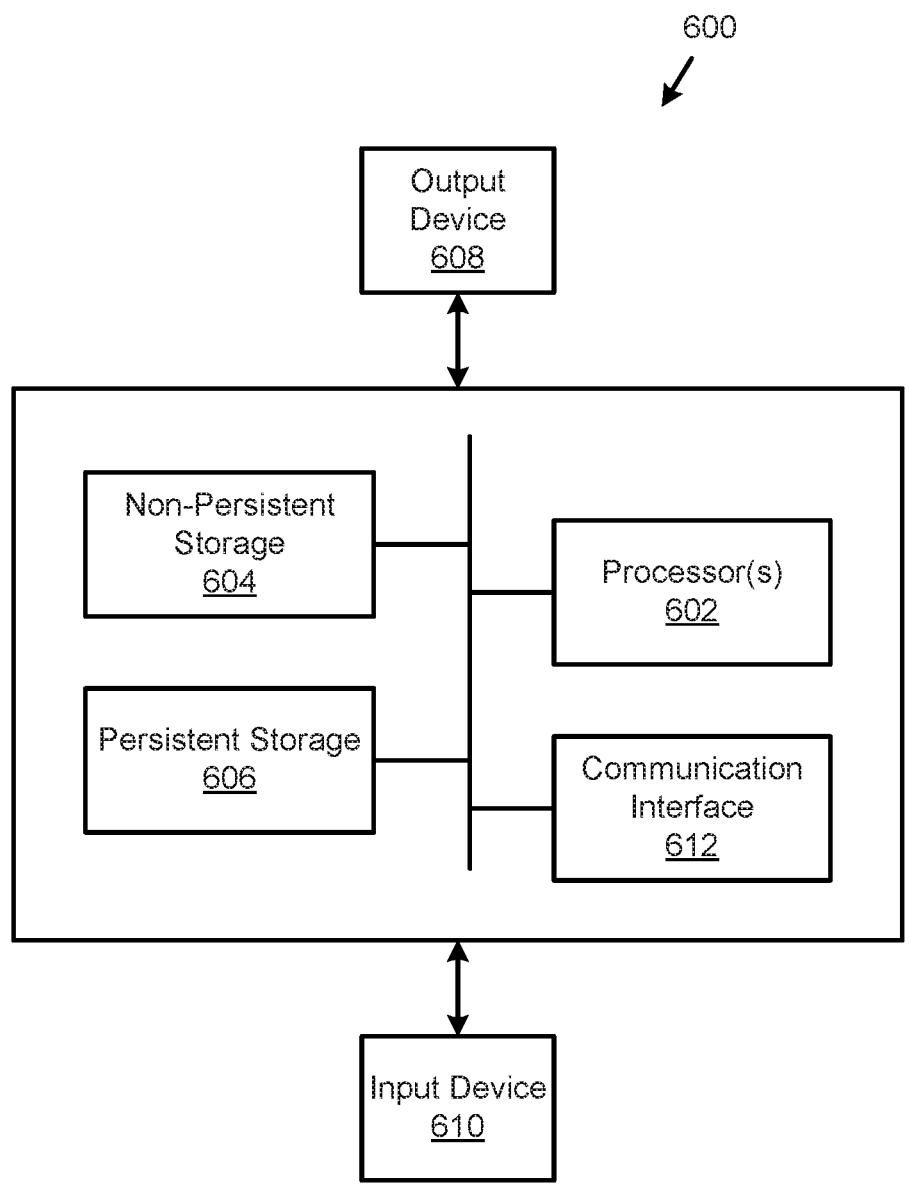
FIG. 6 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for providing unsolicited data to entities in advance of likely requests for the unsolicited data in the future. By doing so, future workloads for providing such information to the entities may be proactively addressed.

To provide the unsolicited data to the entities, embodiments of the invention may provide a method for predicting whether an entity is likely to request unsolicited data in the future. By making such predictions, the future polling workloads associated with the future request for the unsolicited data may be proactively avoided.

Additionally, embodiments of the invention may provide a method for obtaining approval from the entities based on the predictions regarding future requests for unsolicited data. Specifically, embodiments of the invention may utilize a heat map representation of the predictions with which a user may provide feedback regarding the predictions. The user feedback may be utilized to refine event-response preferences that define courses of action to be performed when events occur. By doing so, the courses of actions performed by the storage array in response to events may be made more efficient by eliminating courses of action that would result in the transmission of unsolicited data which hosts are unlikely to request in the future.

Thus, embodiments of the invention may address the problem of the limited availability of computational resources in a distributed system. Specifically, embodiments of the invention may provide a method of responding to requests from hosts in a manner that makes it less likely that additional, similar requests will be issued by the hosts in the future.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage array for providing data storage services, comprising:
persistent storage for storing approved preferences; and
a storage array manager programmed to:
obtain event-response preferences for hosts receiving the data storage services;
predict, based on the event-response preferences, a set of additional event-response preferences for a host of the hosts;
predict an additional event-response preference for a host of the hosts based on a request associated with a second host of the hosts;
generate a heat map for the host based on:
the event-response preferences,
the set of additional event-response preferences,
the additional event-response preference, and
global event-response preferences that associate events with responses for all of the hosts;
obtain host input, using the heat map, to identify a final set of event-response preferences for the host;
update the approved preferences based on the final set of event-response preferences for the host to obtain updated approved preferences; and
provide unsolicited data to the host based on the updated approved preferences.

2. The storage array of claim 1, wherein predicting, based on the event-response preferences, a set of additional event-response preferences for a host of the hosts comprises:
matching the event-response preferences for hosts to second event-response preferences for a third host of the hosts; and
adding an event-response preference of the second event-response preferences that is not included in the event-response preferences to the set of additional event-response preferences for the host of the hosts.

3. The storage array of claim 1, wherein the event-response preferences comprises:
an event-response preference that specifies a response that the storage array should perform when the storage array identifies an event corresponding to the response.

4. The storage array of claim 3, wherein the response is a type of information to be provided to the host.

5. The storage array of claim 3, wherein the event is a request for a type of information from a different host of the hosts received by the storage array.

6. The storage array of claim 1, wherein the unsolicited data is also provided to a second host of the hosts.

7. The storage array of claim 6, wherein the unsolicited data is provided to the host in response to an occurrence of an event that the updated approved preferences associates with a response for the host that requires that the host be provided with the unsolicited data.

8. The storage array of claim 1, wherein obtaining the host input, using the heat map, to identify the final set of event-response preferences for the host comprises:
determining that the host input indicates that one of the set of additional event-response preferences for the host is not to be included in the final set of event-response preferences for the host; and
based on the determination, not including the one of the set of additional event-response preferences for the host in the final set of event-response preferences for the host.

9. The storage array of claim 1, wherein obtaining the host input, using the heat map, to identify the final set of event-response preferences for the host comprises:
determining that the host input indicates that an event-response preference of the global event-response preferences is not to be included in the final set of event-response preferences for the host; and
based on the determination, not including the event-response preference of the global event-response preferences in the final set of event-response preferences for the host.

10. The storage array of claim 1, wherein the unsolicited data comprises a portion of data stored in the persistent storage as part of providing the data storage services.

11. A method for providing data storage services, comprising:
obtaining event-response preferences for hosts receiving the data storage services;
predicting, based on the event-response preferences, a set of additional event-response preferences for a host of the hosts;
predicting an additional event-response preference for a host of the hosts based on a request associated with a second host of the hosts;

generating a heat map for the host based on:
  the event-response preferences,
  the set of additional event-response preferences,
  the additional event-response preference, and
  global event-response preferences that associate events with responses for all of the hosts;
obtaining host input, using the heat map, to identify a final set of event-response preferences for the host;
updating approved preferences based on the final set of event-response preferences for the host to obtain updated approved preferences; and
providing unsolicited data to the host based on the updated approved preferences.

12. The method of claim 11, wherein predicting, based on the event-response preferences, a set of additional event-response preferences for a host of the hosts comprises:
  matching the event-response preferences for hosts to second event-response preferences for a third host of the hosts; and
  adding an event-response preference of the second event-response preferences that is not included in the event-response preferences to the set of additional event-response preferences for the host of the hosts.

13. The method of claim 11, wherein the event-response preferences comprises:
  an event-response preference that specifies a response that a storage array providing the data storage services should perform when the storage array identifies an event corresponding to the response.

14. The method of claim 13, wherein the response is a type of information to be provided to the host.

15. The method of claim 13, wherein the event is a request for a type of information from a different host of the hosts received by the storage array.

16. A non-transitory computer readable medium comprising computer readable program code, which when executed by a computer processor enables the computer processor to perform a method for providing data storage services, the method comprising:
  obtaining event-response preferences for hosts receiving the data storage services;
  predicting, based on the event-response preferences, a set of additional event-response preferences for a host of the hosts;
  predicting an additional event-response preference for a host of the hosts based on a request associated with a second host of the hosts;
  generating a heat map for the host based on:
    the event-response preferences,
    the set of additional event-response preferences,
    the additional event-response preference, and
    global event-response preferences that associate events with responses for all of the hosts;
  obtaining host input, using the heat map, to identify a final set of event-response preferences for the host;
  updating approved preferences based on the final set of event-response preferences for the host to obtain updated approved preferences; and
  providing unsolicited data to the host based on the updated approved preferences.

17. The non-transitory computer readable medium of claim 16, wherein predicting, based on the event-response preferences, a set of additional event-response preferences for a host of the hosts comprises:
  matching the event-response preferences for hosts to second event-response preferences for a third host of the hosts; and
  adding an event-response preference of the second event-response preferences that is not included in the event-response preferences to the set of additional event-response preferences for the host of the hosts.

18. The non-transitory computer readable medium of claim 16, wherein the event-response preferences comprises:
  an event-response preference that specifies a response that a storage array providing the data storage services should perform when the storage array identifies an event corresponding to the response.

19. The non-transitory computer readable medium of claim 18, wherein the response is a type of information to be provided to the host.

20. The non-transitory computer readable medium of claim 18, wherein the event is a request for a type of information from a different host of the hosts received by the storage array.

* * * * *